(12) United States Patent
Kawamura et al.

(10) Patent No.: US 8,593,928 B2
(45) Date of Patent: Nov. 26, 2013

(54) OPTICAL HEAD AND OPTICAL DRIVE DEVICE

(75) Inventors: Tomoto Kawamura, Yokohama (JP); Kotaro Oishi, Fujisawa (JP); Toshiteru Nakamura, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/462,847

(22) Filed: May 3, 2012

(65) Prior Publication Data
US 2012/0287765 A1 Nov. 15, 2012

(30) Foreign Application Priority Data
May 13, 2011 (JP) ................................. 2011-107840

(51) Int. Cl.
*G11B 7/135* (2012.01)

(52) U.S. Cl.
USPC .................................................... 369/112.12

(58) Field of Classification Search
None
See application file for complete search history.

(56) References Cited

U.S. PATENT DOCUMENTS

| | | | |
|---|---|---|---|
| 3,909,608 A | 9/1975 | Le Merer et al. | |
| 5,835,471 A * | 11/1998 | Miyamoto et al. | 369/112.07 |
| 6,282,164 B1 * | 8/2001 | Katayama | 369/112.12 |
| 6,418,098 B1 * | 7/2002 | Yamamoto et al. | 369/44.41 |
| 6,707,773 B2 * | 3/2004 | Katayama | 369/53.19 |
| 6,807,133 B2 * | 10/2004 | Ariyoshi et al. | 369/44.42 |
| 7,203,138 B2 * | 4/2007 | Sano et al. | 369/44.26 |
| 8,295,145 B2 * | 10/2012 | Yamazaki | 369/112.12 |
| 2002/0003766 A1 * | 1/2002 | Kadowaki et al. | 369/112.07 |
| 2002/0159378 A1 * | 10/2002 | Lee et al. | 369/112.12 |
| 2003/0007436 A1 * | 1/2003 | Komma et al. | 369/53.2 |
| 2003/0053395 A1 * | 3/2003 | Kadowaki et al. | 369/112.12 |
| 2004/0027939 A1 * | 2/2004 | Okada | 369/44.37 |
| 2004/0228236 A1 * | 11/2004 | Sakai et al. | 369/44.41 |
| 2008/0253263 A1 * | 10/2008 | Komma | 369/112.05 |
| 2009/0213708 A1 * | 8/2009 | Kusanagi | 369/47.5 |
| 2010/0046340 A1 * | 2/2010 | Nishiyama | 369/53.17 |
| 2012/0287765 A1 * | 11/2012 | Kawamura et al. | 369/44.23 |

FOREIGN PATENT DOCUMENTS

JP 2-236827 9/1990

* cited by examiner

*Primary Examiner* — Peter Vincent Agustin
(74) *Attorney, Agent, or Firm* — Antonelli, Terry, Stout & Kraus, LLP.

(57) ABSTRACT

The present invention provides a unit and method for implementing an optical head and optical drive device whose configuration is simple, and which allows the generation of a track error signal in which no offset is caused to occur. The optical drive device includes a light source for emitting light beams, an objective lens for converging the light beams onto an optical disc, an optical-signal generation element for dividing the light beams into at least four regions by using a division line extending in the radial direction of the optical disc, and a division line extending in the track direction of the optical disc, the light beams being reflected by the optical disc, and an optical detector for receiving the light beams divided by the optical-signal generation element, wherein the up and down or right and left areas of the four regions are made different from each other.

14 Claims, 14 Drawing Sheets

A,B,C,D

A+B, C+D

A+k1D, k2B+C

PP

LE

TE

OPTICAL HEAD AND OPTICAL DRIVE DEVICE

INCORPORATION BY REFERENCE

The present application claims priority from Japanese application JP2011-107840 filed on May 13, 2011, the content of which is hereby incorporated by reference into this application.

BACKGROUND OF THE INVENTION

The present invention relates to an optical head and optical drive device which allows execution of the reproduction or recording of an optical disc.

JP-A-02-236827 (Patent Document 1) exists as a prior art in the present technological field. In JP-A-02-236827, the description has been given as follows: "There is provided an optical reproduction device equipped with a diffraction-based track recording medium. The present optical reproduction device generates positive and negative different-signs' signals at the forward end and backward end of a diffraction element. In this way, the present device makes it possible to detect the diffraction element regardless of length of the diffraction element. The present device also makes it possible to detect even a kind of diffraction element whose length is equal to whose width. The present device is also applicable to the case of the reflection-based reading of information stored in a substrate medium".

SUMMARY OF THE INVENTION

Examples of the standardized optical discs are BD (: Blu-ray Disc), DVD (: Digital Versatile Disc), and CD (: Compact Disc). In an optical head for performing the recording or reproduction of an optical disc like this, the recording or reproduction is performed as follows: Namely, light beams are emitted from a light source. Then, the light beams are converged onto an optical disc by using an objective lens. Next, the light beams, which are reflected by the optical disc, are detected using an optical detector. Moreover, from the signal detected, the following signals are generated: A reproduction signal of the optical disc, a track error signal (which, hereinafter, will be described as "TE signal"), and a focus error signal (which, hereinafter, will be described as "FE signal"). Here, the track error signal is a signal for controlling a shift between an optical spot on the optical disc and a guide groove (which, hereinafter, will be described as "track") within the optical disc. Also, the focus error signal is a signal for controlling a focal-point-achieving shift of the optical spot on the optical disc. In an optical drive device, the position of the objective lens is controlled based on these signals, and using an actuator. This objective-lens control permits the optical spot to illuminate a predetermined position on the optical disc. The control based on the track error signal will be described as "tracking", and the control based on the focus error signal will be described as "focusing".

Also, the objective lens is displaced in the radial direction of the optical disc by using the actuator. This radial-direction displacement of the objective lens will be described as "objective-lens shift".

The generation scheme for generating the track error signal is, e.g., a push-pull scheme disclosed in JP-A-02-236827. This push-pull scheme has its drawback in the following point: Namely, an offset is caused to occur in the track error signal when the objective-lens shift is performed.

It is an object of the present invention to provide a unit and method for implementing an optical head and optical drive device whose configuration is simple, and which allows the generation of a track error signal in which the above-described offset is not caused to occur.

The above-described object can be accomplished based on a configuration which will be disclosed within the scope of appended claims as an example.

According to the present invention, it becomes possible to implement an inexpensive optical head and optical drive device that allows the generation of a track error signal in which no offset is caused to occur even if the objective-lens shift is performed.

Other objects, features and advantages of the invention will become apparent from the following description of the embodiments of the invention taken in conjunction with the accompanying drawings.

DESCRIPTION OF THE INVENTION

Figure 1:
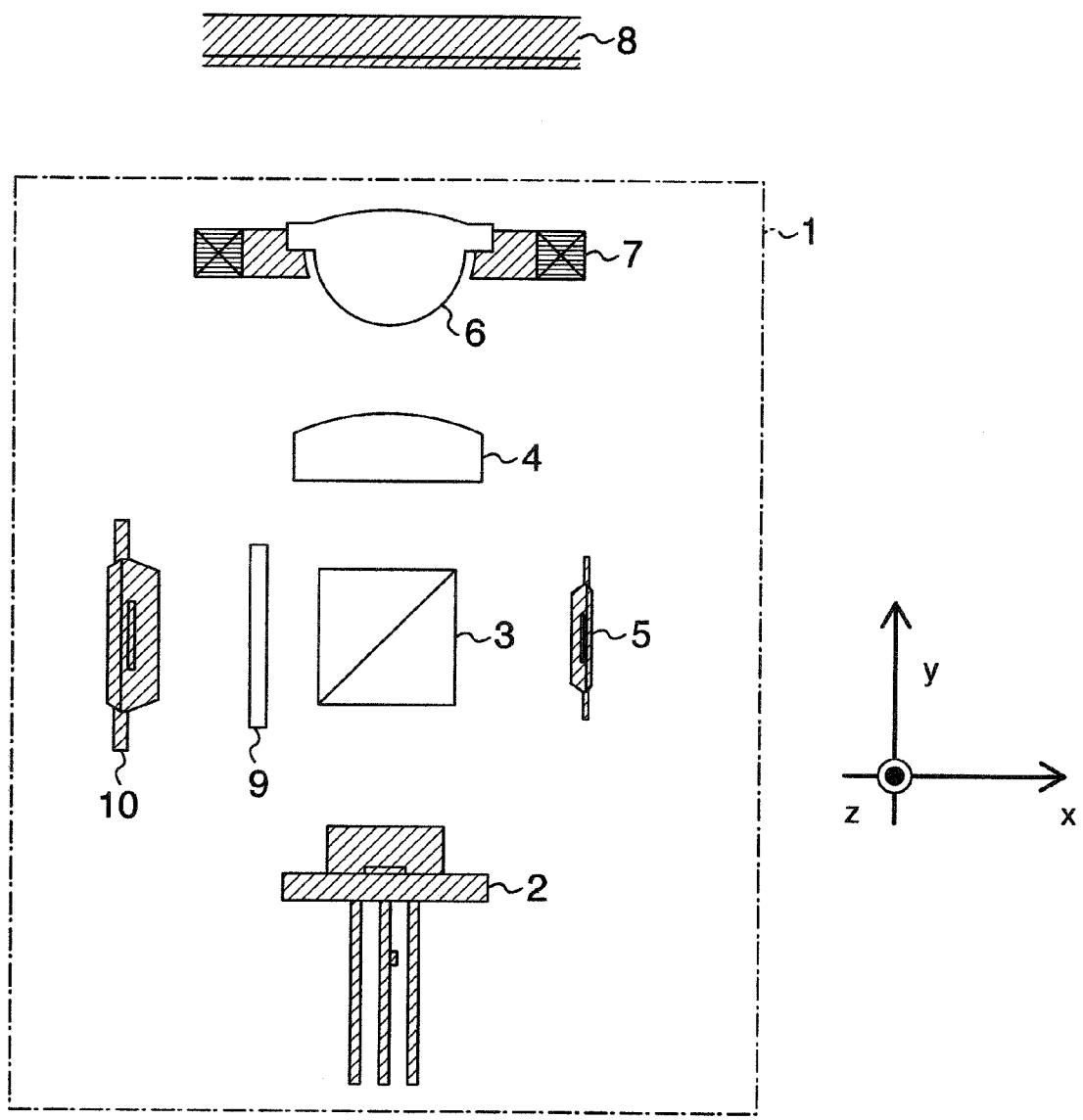
FIG. 1 is a schematic configuration diagram of an optical head 1 in a first embodiment.

Hereinafter, based on embodiments illustrated in the drawings, the detailed explanation will be given below concerning the embodiments of the present invention. The present invention, however, is not limited at all by this explanation.

Embodiment 1

Referring to the drawings, the explanation will be given below concerning a first embodiment of the present invention. Here, the explanation will be given selecting an optical head and optical drive device as its example. More concretely, the optical head and optical drive device selected corresponds to an optical head and optical drive device which allows execution of the recording or reproduction of an optical disc whose standard is either the DVD or the BD.

FIG. 1 is a schematic configuration diagram of an optical head 1 in the first embodiment. Light beams are emitted from a light source 2 as divergence light and in the y direction illustrated in the drawing. In order to execute the recording/reproduction of information into/from an optical disc, a semiconductor laser is commonly used. Accordingly, the light source 2 is a semiconductor laser for emitting laser beams of a predetermined wavelength.

The light beams emitted from the light source 2 enter an optical-beam splitter 3. On account of the optical-beam splitter 3, a predetermined light amount of the light beams which have entered the optical-beam splitter 3 is permitted to pass therethrough. Meanwhile, the remaining light amount of the light beams is caused to be reflected thereby. Namely, the optical-beam splitter 3 is an optical element for causing the light beams to branch into the two light beams. A function like this can be implemented using prisms such as, e.g., a half prism and a polarization-property prism.

Of the light beams which have entered the optical-beam splitter 3, the light beams permitted to pass therethrough travel to a collimator lens 4. Meanwhile, the light beams reflected thereby travel to a front monitor 5. The light beams which have traveled to the collimator lens 4 are converted into substantially parallel light beams.

In general, the light amount of light beams which are emitted from a light source is proportional to an electric current injected. The electric current for the light amount, however, has such drawbacks as its individual offset is large, and it changes depending on the peripheral temperature. At the time of the reproduction of an optical disc, and at the time of the recording thereof in particular, the light amount of the light beams with which the optical disc is to be illuminated is required to be precisely controlled. For this purpose, the optical head 1 is so configured as to be able to implement a feedback control so that the light amount on the optical disc becomes equal to a predetermined value. Concretely, this feedback control is implemented by detecting, with the front monitor 5, the light amount of the light beams which are reflected by the optical-beam splitter 3 and are caused to branch into the front monitor 5.

The light beams converted into the substantially parallel light beams by the collimator lens 4 enter an objective lens 6, thereby being converged onto the information plane of an optical disc 8.

The objective lens 6, which is mounted on an actuator 7, can be driven at least in the x and y directions illustrated in the drawing. In the drawing, the arrow x indicates a direction which is perpendicular to tracks existing on the information plane of the optical disc 8, i.e., the radial direction of the optical disc 8. The arrow y indicates a normal direction which is normal to the information plane of the optical disc 8. The arrow z indicates a direction (which, hereinafter, will be described as "track direction") that is parallel to the tracks existing on the information plane. Namely, the x direction is used for the control based on a track error signal, and the driving for the objective-lens shift, and the y direction is used for the control based on a focus error signal.

The light beams reflected by the optical disc 8 travel through the objective lens 6 and the collimator lens 4, then being reflected by the optical-beam splitter 3. After that, the light beams reflected enter an optical-signal generation element 9. The optical-signal generation element 9 divides the light beams, which have entered the generation element 9, on each its predetermined-region basis. This division of the light beams is performed in order to generate signals.

The light beams, which are divided by the optical-signal generation element 9, are detected on light-receiving planes of an optical detector 10.

The light beams guided up to the optical detector 10 are used for generating a reproduction signal recorded on the information plane of the optical disc 8. Also, the light beams are used for generating such signals as the track error signal and the focus error signal.

Hereinafter, the optical path extending from the light source 2 to the optical disc 8 will be described as "forth-reciprocation path". Also, the optical path extending from the optical disc 8 to the optical detector 10 will be described as "back-reciprocation path".

The optical-signal generation element 9 may be deployed on the optical path where the forth-reciprocation path and the back-reciprocation path are common to each other (i.e., the optical path between the optical-beam splitter 3 and the objective lens 6). In this case, the optical-signal generation can be implemented by taking advantage of a polarization property where the light beams along the forth-reciprocation path are not divided, and where only the light beams along the back-reciprocation path are divided. Optical elements having the polarization property is more expensive as compared with parts having no polarization property. Accordingly, it is desirable from the cost's point-of-view that, like the optical head 1, the optical-signal generation element 9 be deployed between the optical-beam splitter 3 and the optical detector 10.

Figure 2:
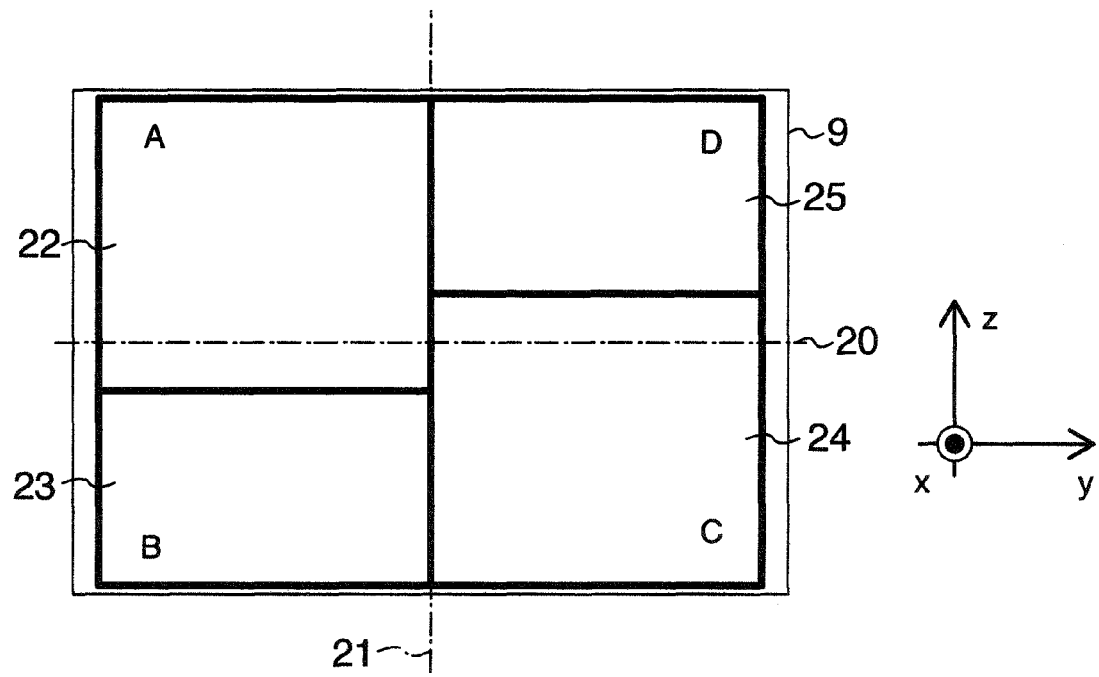
FIG. 2 is a schematic configuration diagram of an optical-signal generation element 9 in the first embodiment.

Next, the explanation will be given below regarding the optical-signal generation element 9. FIG. 2 is a schematic configuration diagram of the optical-signal generation element 9. FIG. 2 is the diagram acquired when the optical-signal generation element 9 is seen from the optical-beam splitter 3. In FIG. 2, the arrows x, y, and z indicate the normal direction of the optical-signal generation element 9, the transverse direction thereof, and the height direction thereof, respectively. In particular, when the cross-section of the light beams which have entered the generation element 9 is assumed, the radial direction of the optical disc 8 is equivalent to the y direction, and the track direction is equivalent to the z direction. Namely, an alternate long-and-short dashed line 20 and an alternate long-and-short dashed line 21 are equivalent to the radial direction of the optical disc 8 and the track direction of the optical disc 8, respectively. Also, the intersection point of the alternate long-and-short dashed line 20 and the alternate long-and-short dashed line 21 is assumed to be the center of the optical-signal generation element 9.

Namely, it can be said that the following condition is desirable when assembling the optical head 1: Namely, the optical-signal generation element 9 is adjusted in the y and z directions so that the intersection point of the alternate long-and-short dashed line 20 and the alternate long-and-short dashed line 21 and the center of the light beams 50 which are to enter the optical-signal generation element 9 coincide with each other.

By the way, the optical-signal generation element 9 is an optical element for dividing the light beams, which have entered the generation element 9, on each its predetermined-region basis. This division of the light beams is performed in order to generate the track error signal. Here, the explanation will be given selecting the following example: The generation element 9 is assumed to be a diffraction grating in which the settings for factors, such as the spacing and angle of the diffraction grating's grooves, are different on each its region basis. Namely, this example physically corresponds to the fact that that the light beams which have entered each region of the diffraction grating (i.e., optical-signal generation element 9) are divided into ±1st-order diffraction light beams.

The optical-signal generation element 9 is constituted by four units of regions, i.e., a region A 22, a region B 23, a region C 24, and a region D 25. The region A 22 and the region B 23, and the region C 24 and the region D 25 are divided by the alternate long-and-short dashed line 21 in the y direction. Also, the region A 22 and the region B23 are divided in the z direction by a line which is parallel to the alternate long-and-short dashed line 20. The boundary between the region A 22 and the region B23 is offset in parallel to the alternate long-and-short dashed line 20, and by a predetermined amount therefrom in the downward direction in the drawing. Also, the region C24 and the region D25 are divided in the z direction by a line which is parallel to the alternate long-and-short dashed line 20. The boundary between the region C24 and the region D25 is offset in parallel to the alternate long-and-short dashed line 20, and by a predetermined amount therefrom in the upward direction in the drawing.

At this time, it is desirable that the amount of the offset for the boundary between the region A 22 and the region B 23 from the alternate long-and-short dashed line 20, and the amount of the offset for the boundary between the region C24 and the region D25 from the alternate long-and-short dashed line 20 be made substantially equal to each other. Incidentally, if the offset amount is too large or too small, correction coefficients (which will be described later) become large. This situation is undesirable from the point-of-view on the system in the optical drive device. It is desirable that the offset amount be set at about 5 to 35% of the effective diameter of the light beams which are to enter the optical-signal generation element 9.

Figure 3:
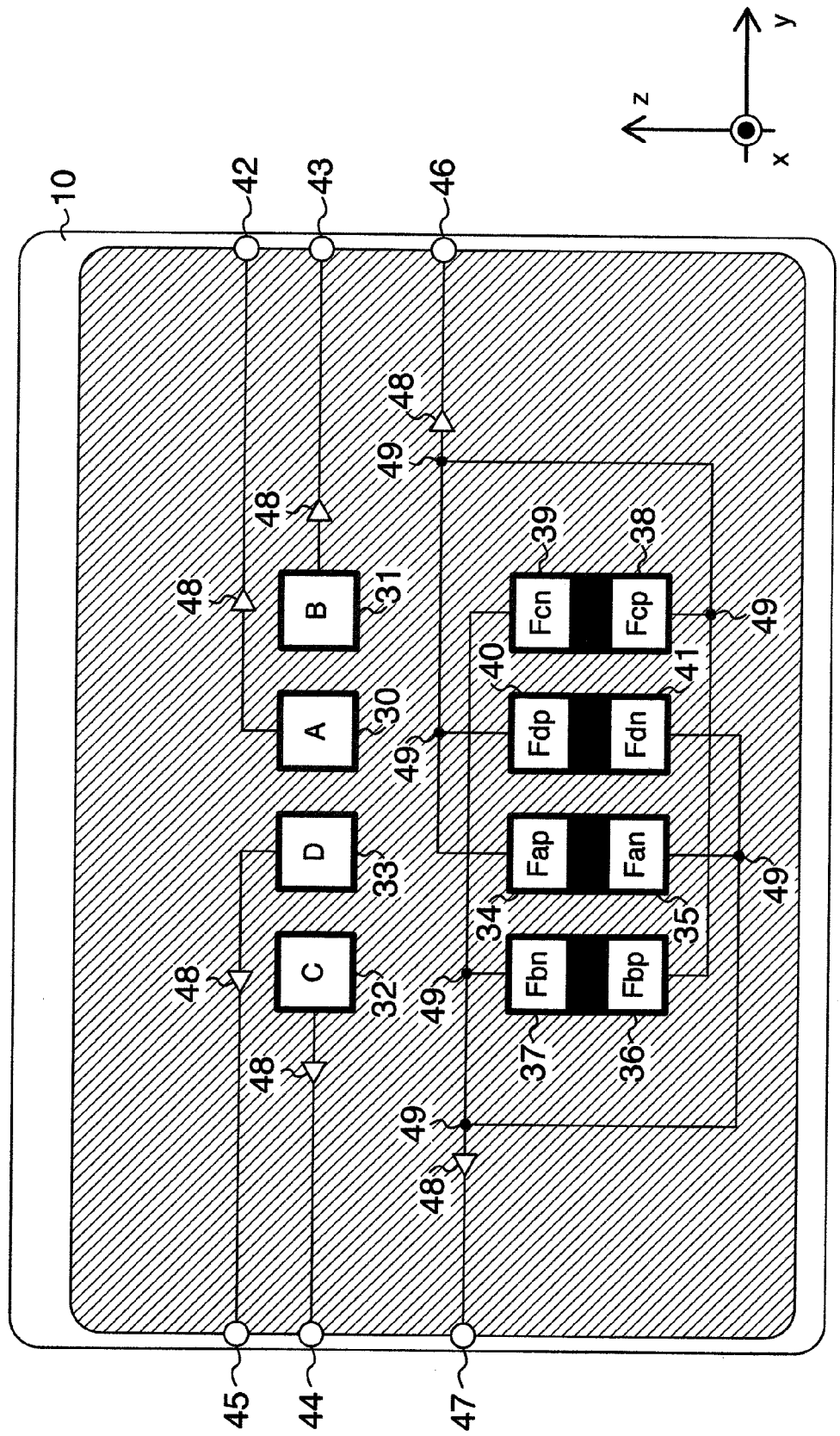
FIG. 3 is a schematic configuration diagram of an optical detector 10 in the first embodiment.

Next, the explanation will be given below concerning the optical detector 10. FIG. 3 is a schematic configuration diagram of the optical detector 10. FIG. 3 is the diagram acquired when the optical detector 10 is seen from the optical-beam splitter 3. The optical detector 10 is constituted by twelve units of light-receiving planes, i.e., a light-receiving plane A 30, a light-receiving plane B 31, a light-receiving plane C 32, a light-receiving plane D 33, a light-receiving plane Fap 34, a light-receiving plane Fan 35, a light-receiving plane Fbp 36, a light-receiving plane Fbn 37, a light-receiving plane Fcp 38, a light-receiving plane Fcn 39, a light-receiving plane Fdp 40, and a light-receiving plane Fdn 41. The +1st-order diffraction light beams which are divided on the region A 22 of the optical-signal generation element 9 will be designated as "light beams A+1". Also, the −1st-order diffraction light beams which are divided on the region A 22 of the optical-signal generation element 9 will be designated as "light beams A−1". Basically the same notations will also be given for the other regions.

The light-receiving plane A30 is a light-receiving plane for receiving the light beams A+1. The light-receiving plane A30 generates an electric current corresponding to the light amount of the light beams. Then, the plane A30 outputs, as a signal, a voltage corresponding to the light amount of the light beams from a terminal A42 via a current-voltage conversion element 48. The light-receiving plane B31 is a light-receiving plane for receiving the light beams B+1. The light-receiving plane B31 generates an electric current corresponding to the light amount of the light beams. Then, the plane B31 outputs, as a signal, a voltage corresponding to the light amount of the light beams from a terminal B43 via the current-voltage conversion element 48. The light-receiving plane C32 is a light-receiving plane for receiving the light beams C+1. The light-receiving plane C32 generates an electric current corresponding to the light amount of the light beams. Then, the plane C32 outputs, as a signal, a voltage corresponding to the light amount of the light beams from a terminal C 44 via the current-voltage conversion element 48. The light-receiving plane D 33 is a light-receiving plane for receiving the light beams D+1. The light-receiving plane D33 generates an electric current corresponding to the light amount of the light beams. Then, the plane D33 outputs, as a signal, a voltage corresponding to the light amount of the light beams from a terminal D 45 via the current-voltage conversion element 48.

The light-receiving plane Fap 34 and the light-receiving plane Fan 35 are light-receiving planes for receiving the light beams A−1. When the light beams are divided on each region basis, it becomes possible to generate the focus error signal based on the knife-edge scheme. On account of this, it is assumed in the optical head 1 to generate the knife-edge-scheme-based focus error signal. The boundary between the light-receiving plane Fap34 and the light-receiving plane Fan35 corresponds to the so-called "dark line". Since the generation of the knife-edge-scheme-based focus error signal is a general technology, the detailed explanation thereof will be omitted here.

The light-receiving plane Fbp 36 and the light-receiving plane Fbn 37 are light-receiving planes for receiving the light beams B−1. The boundary therebetween has also become a dark line. The light-receiving plane Fcp 38 and the light-receiving plane Fcn 39 are light-receiving planes for receiving the light beams C−1. The boundary therebetween has also become a dark line. The light-receiving plane Fdp 40 and the light-receiving plane Fdn 41 are light-receiving planes for receiving the light beams D−1. The boundary therebetween has also become a dark line.

Each of the light-receiving plane Fap34, the light-receiving plane Fbp36, the light-receiving plane Fcp38, and the light-receiving plane Fdp40 generates an electric current in correspondence with the light amount of the light beams that each light-receiving plane has received. Then, the respective electric currents are added at each connection point 49. Moreover, each light-receiving plane outputs the voltage as a signal from a terminal Fp 46 via the current-voltage conversion element 48. Each of the light-receiving plane Fan 35, the light-receiving plane Fbn 37, the light-receiving plane Fcn 39, and the light-receiving plane Fdn 41 generates an electric current in correspondence with the light amount of the light beams that each light-receiving plane has received. Then, the respective electric currents are added at each connection point 49. Moreover, each light-receiving plane outputs the voltage as a signal from a terminal Fn 47 via the current-voltage conversion element 48.

Also, the ±1st-order diffraction light beams divided by the diffraction grating fall into a symmetric relationship to each other with reference to the light beams which have passed through the diffraction grating with no division made thereto. On account of this symmetric relationship, the center of the light-receiving plane A 30 and the center of the light-receiving plane Fap 34 and the light-receiving plane Fan 35 are in a symmetric relationship to each other with reference to the light beams which have passed through the diffraction grating with no division made thereto. For example, when a multi-layered optical disc is reproduced, the following drawback exists: Namely, a light beam, which is reflected from an information plane different from the information plane that is being reproduced on the multi-layered optical disc, becomes an external disturbance as a multi-layered stray light. In order to avoid a multi-layered stray light like this, it is desirable to deploy the light-receiving planes in such a manner that the multi-layered stray light does not intrude into the light-receiving planes.

Next, the explanation will be given below regarding calculations whereby signals needed for the optical drive device are generated from the signals outputted by the optical detector 10. The focus error (FE) signal, a push-pull (PP) signal, an objective-lens shift error (LE) signal, the track error (TE) signal, and the reproduction (RF) signal are generated from the following Expression 1, Expression 2, Expression 3, Expression 4, and Expression 5, respectively:

$$FE = (Fp - Fn) \quad \text{(Expression 1)}$$

$$PP = (A+B) - (C+D) \quad \text{(Expression 2)}$$

$$LE = (k_2 \times B + C) - (A + k_1 \times D) \quad \text{(Expression 3)}$$

$$TE = PP - k_3 \times LE \quad \text{(Expression 4)}$$

$$RF = (A + B + C + D) \quad \text{(Expression 5)}$$

In the above-described Expressions, A or the like is equivalent to a signal outputted from a terminal A 42. Basically the same equivalences will also be given for the other signals. Also, in the following explanation, "A or the like" will be described as "signal A or the like". The above-described $k_1$, $k_2$, and $k_3$, which are correction coefficients, will be explained later.

Incidentally, in the present embodiment, the configuration has been selected where, like FIG. 3, the outputs of the respective signals are connected to each other. It is of course completely allowable to select another configuration where, e.g., the outputs are not connected to each other. Connecting the outputs to each other as described above, however, makes it possible to suppress an increase in the number of the output terminals. In the present embodiment, the light-receiving planes of the optical detector 10 have been deployed as are illustrated in FIG. 3. As long as the above-described signals can be acquired, however, the deployment of the light-receiving planes is not limited to this deployment.

Next, referring to FIG. 4A and FIG. 4B to FIG. 6, the explanation will be given below concerning a generation method for generating the track error (TE) signal.

Figure 4A:
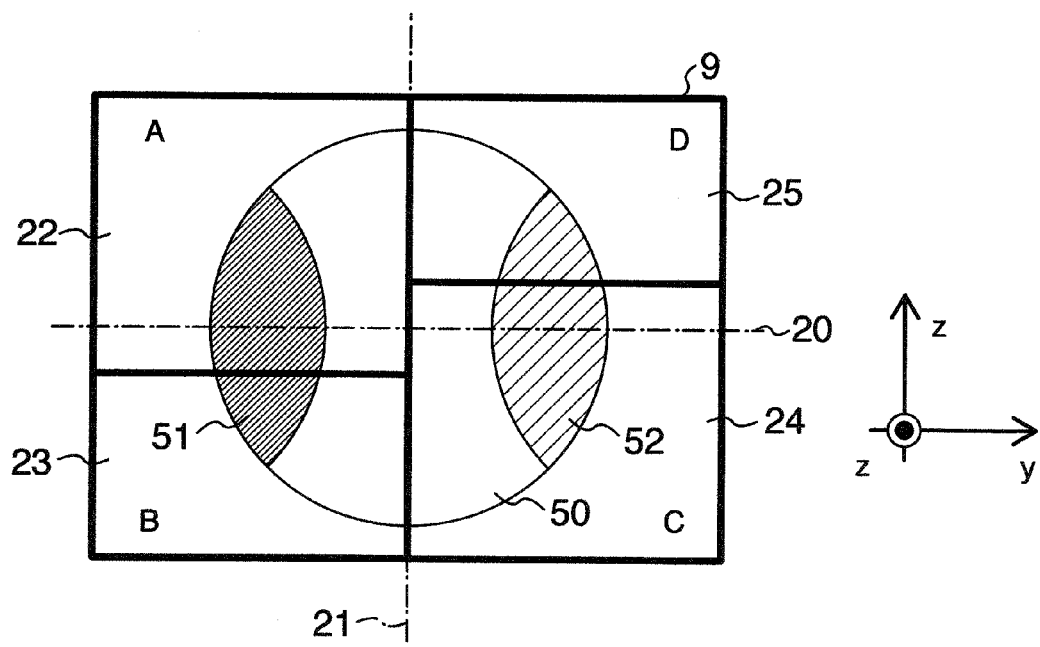
FIG. 4A is a schematic configuration diagram for explaining the relationship between the optical-signal generation element 9 and an incident light beam 50 entering the optical-signal generation element 9 in a case where the amount of the objective-lens shift is equal to zero.
Figure 4B:
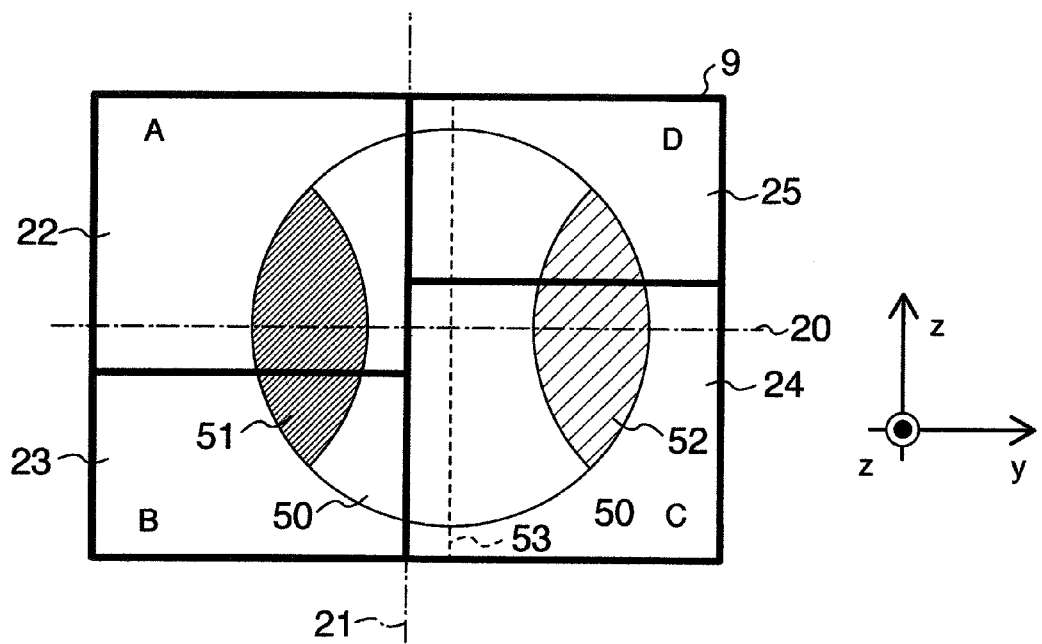
FIG. 4B is a schematic configuration diagram for explaining the relationship between the optical-signal generation element 9 and the incident light beam 50 entering the optical-signal generation element 9 in a case where the amount of the objective-lens shift is equal to $\delta$.

FIG. 4A and FIG. 4B are schematic configuration diagrams for explaining the relationship between the optical-signal generation element 9 and the light beams 50 which have entered the optical-signal generation element 9. FIG. 4A is about the case where the amount of the objective-lens shift is equal to zero; whereas FIG. 4B is about the case where the amount of the objective-lens shift is equal to δ. As is the case with FIG. 2, FIG. 4A and FIG. 4B are the diagrams acquired when the optical-signal generation element 9 is seen from the optical-beam splitter 3.

The cross-section of the light beams which are to enter the optical-signal generation element 9 is illustrated as the light beams 50. The tracks existing on the optical disc 8 cause push-pull images to occur on the light beams 50. The regions where these push-pull images are caused to occur are illustrated as a push-pull region P 51 and a push-pull region N 52. The push-pull region P 51 and the push-pull region N 52 are the following regions: Namely, if the optical spot existing on the optical disc 8 is displaced in the radial direction of the optical disc 8, the light amounts in the push-pull regions P 51 and N 52 flicker in opposite phases to each other.

In the case where the amount of the objective-lens shift is equal to zero, as described earlier, and as illustrated in FIG. 4A, the intersection point of the alternate long-and-short dashed line 20 and the alternate long-and-short dashed line 21 and the center of the light beams 50 coincide with each other. Meanwhile, in the case where the amount of the objective-lens shift is equal to δ, as illustrated in FIG. 4B, the center of the light beams 50 is displaced in the radial direction (i.e., y direction in the drawing) of the optical disc 8 up to a dashed line 53.

The calculation for generating the push-pull (PP) signal in the above-described Expression 2 is equivalent to a difference between an addition signal of the region A 22 and the region B 23 in the drawing, and an addition signal of the region C 24 and the region D 25 therein. Namely, the PP signal is the difference signal between the signals from the right and left regions which sandwich therebetween the division line extending in the z direction in the drawing.

In the case where the amount of the objective-lens shift is equal to zero, the right and left areas of the light beams 50, which sandwich therebetween the division line extending in the z direction in the drawing, are equal to each other. As a result, the difference between the light amounts in a DC component becomes equal to zero. Accordingly, the difference between the light amounts in an AC component, i.e., the flickering of the light amounts in the push-pull regions P 51 and N 52, is obtained as the signal. Incidentally, here, the DC component refers to a constant signal equipped with none of the flickering of the light amounts in the push-pull regions P 51 and N 52. Meanwhile, the AC component refers to a signal equipped with a periodic change based on the flickering of the light amounts in the push-pull regions P 51 and N 52.

Meanwhile, in the case where the amount of the objective-lens shift is equal to δ, the right and left areas of the light beams 50, which sandwich therebetween the division line extending in the z direction in the drawing, become different from each other. As a result, the difference between the light amounts in the DC component is caused to occur as an offset. The areas of the push-pull regions P 51 and N 52 remain unchanged from the areas in the case where the amount of the objective-lens shift is equal to zero. Accordingly, the signal of the AC component is obtained which is the same as the signal in the case where the amount of the objective-lens shift is equal to zero.

Namely, the PP signal is a signal whose DC component is caused to offset by the objective-lens shift, but whose AC component remains unchanged even if the objective-lens shift is performed.

The calculation for generating the objective-lens shift error (LE) signal in the above-described Expression 3 is equivalent to a difference between an addition signal of the region A 22 and the region D 25 in the drawing, and an addition signal of the region B 23 and the region C 24 therein. Namely, the LE signal is generated from the difference between the signals from the up and down regions in the drawing.

In the case where the amount of the objective-lens shift is equal to zero, as is clearly seen from FIG. 4A, the region A 22 includes the push-pull region P 51 partially, and the region D 25 includes the push-pull region N 52 partially. Since the push-pull region P 51 and the push-pull region N 52 are in the opposite phases to each other, their addition cancels out the addition signal.

The area of the push-pull region P51 included within the region A22 is larger than the area of the push-pull region N52 included within the region D25. The correction coefficient for correcting this difference between these areas is the correction coefficient $k_1$. Namely, the signal $(A+k_1 \times D)$, i.e., the addition of the signal A and the signal D multiplied by the correction coefficient $k_1$, turns out to be a DC-component-alone-equipped signal whose AC component is eliminated.

Also, similarly, as is clearly seen from FIG. 4A, the region B23 includes the push-pull region P51 partially, and the region C24 includes the push-pull region N52 partially. The area of the push-pull region P51 included within the region B23 is smaller than the area of the push-pull region N52 included within the region C24. The correction coefficient for correcting this difference between these areas is the correction coefficient $k_2$. Namely, the signal $(k_2 \times B+C)$, i.e., the addition of the signal B multiplied by the correction coefficient $k_2$ and the signal C, turns out to be a DC-component-alone-equipped signal whose AC component is eliminated.

In the present embodiment, the signal D and the signal B have been multiplied by the correction coefficient $k_1$ and the correction coefficient $k_2$, respectively. This multiplication is performed so that, in the signal intensity, the signals from the region B23 and region D25 whose regional areas are smaller become substantially equal to the signals from the region A 22 and region C 24 whose regional areas are larger. This kind of multiplication, however, is not limited to this multiplication. Namely, conversely, it is also allowable to multiply the signal A and the signal C by the correction coefficients $k_1$ and $k_2$, respectively. Also, the correction coefficients $k_1$ and $k_2$ are set so that the AC components of the signals $(A+k_1 \times D)$ and $(k_2 \times B+C)$ become equal to zero. This setting allows the amplitude of the PP signal to be employed as the amplitude of the TE signal with no change made thereto, thereby successfully exhibiting an effect of being capable of acquiring the TE signal without reducing the amplitude of the TE signal. This kind of setting, however, is not necessarily limited to this setting. Namely, it is quite satisfying if, ultimately, the offset caused to occur in the TE signal has been successfully eliminated. Consequently, the correction coefficients $k_1$ and $k_2$ are not necessarily required to be the correction coefficients which permit the AC components to become completely equal to zero.

As is indicated in the Expression 3, the LE signal is generated from the difference between the signals $(k_2 \times B+C)$ and $(A+k_1 \times D)$ whose AC components are eliminated. This fact shows that the LE signal turns out to be a DC-component-alone-equipped signal. In the case where the amount of the objective-lens shift is equal to zero, the LE signal is symmetric between the up and down regions. As a result, the difference between the light amounts in the DC component becomes equal to zero. The AC component is lost in the LE signal at this time.

Meanwhile, in the case where the amount of the objective-lens shift is equal to δ, as is clearly seen from FIG. 4B, the area of the push-pull region P51 included within the region A 22 and the region B 23, and the area of the push-pull region N52 included within the region C 24 and the region D 25 remain unchanged from these areas illustrated in FIG. 4A. This fact shows that, even in the case where the amount of the objective-lens shift is equal to δ, the LE signal is maintained in the state where the AC component is lost therein. Also, the area of the optical beam 50 included within the region A 22 and the region D 25 becomes smaller as compared with the area of the optical beam 50 included within the region B 23 and the region C 24. Namely, it turns out that an offset is caused to occur in the DC component of the LE signal by the difference between the up and down areas of the optical beam 50.

Summarizing the above-described description results in the following conclusion: Namely, the LE signal is a signal whose DC component is caused to offset by the objective-lens shift, but whose AC component remains unchanged from the eliminated state even if the objective-lens shift is performed.

As is indicated in the Expression 4, the track error (TE) signal is the difference between the PP signal and the LE signal multiplied by the correction coefficient $k_3$. Regardless of the objective-lens shift, the AC component of the TE signal depends on the PP signal alone. Also, the DC component of the TE signal is caused to occur as an offset in each of the PP signal and the LE signal by the objective-lens shift. Accordingly, the correction coefficient $k_3$ is set so that the DC components of the PP signal and the LE signal depend on the objective-lens shift amount, and become the same change's inclination. This setting for the correction coefficient $k_3$ makes it possible to eliminate the offset which is caused to occur in each signal when the objective-lens shift is performed. Namely, the TE signal is acquired regardless of the objective-lens shift, and only as the AC component of the PP signal. Consequently, it becomes possible to acquire the TE signal in which no offset is caused to occur even if the objective-lens shift is performed.

Figure 5A:
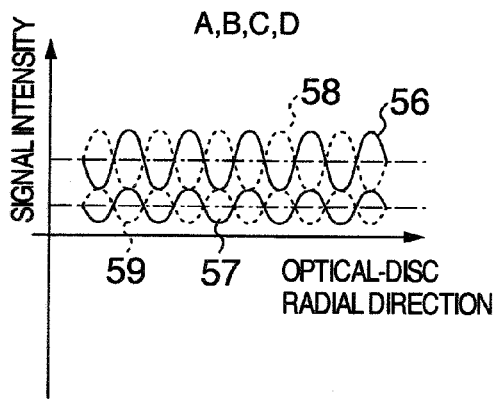
FIG. 5A to FIG. 5F are diagrams for explaining a TE signal when the amount of the objective-lens shift in the first embodiment is equal to zero.
Figure 5B:
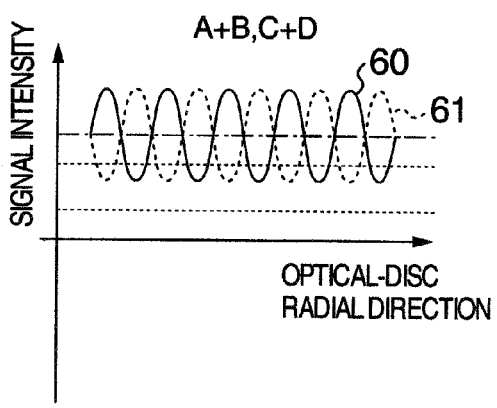
Figure 5C:
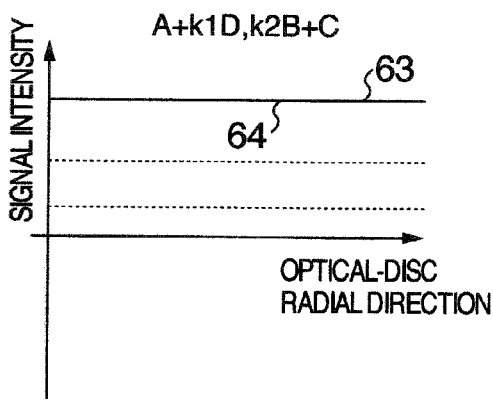
Figure 5D:
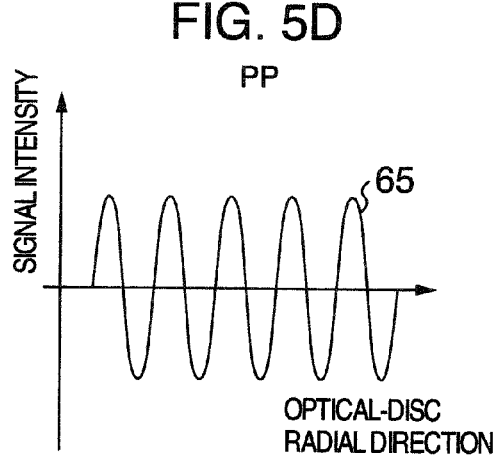
Figure 5E:
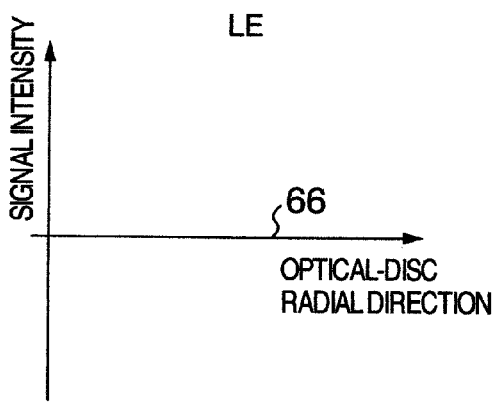
Figure 5F:
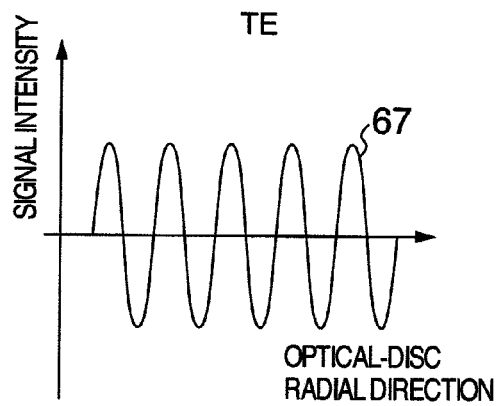
Figure 6A:
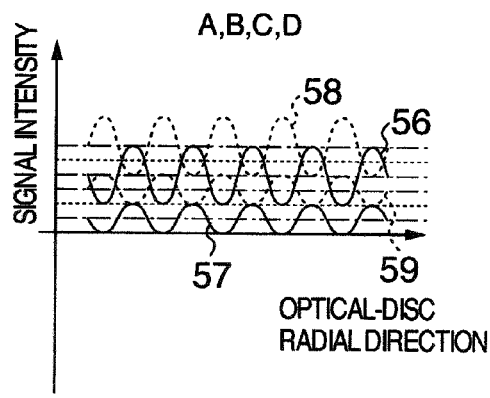
FIG. 6A to FIG. 6F are diagrams for explaining the TE signal when the amount of the objective-lens shift in the first embodiment is equal to $\delta$.
Figure 6B:
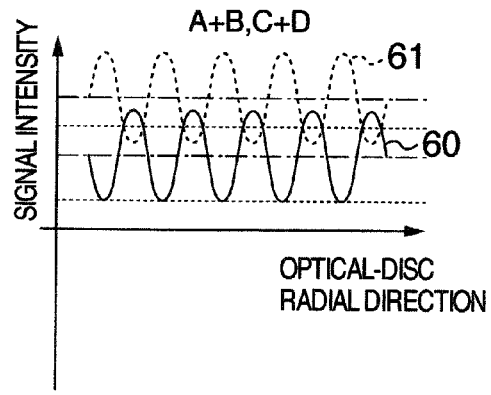
Figure 6C:
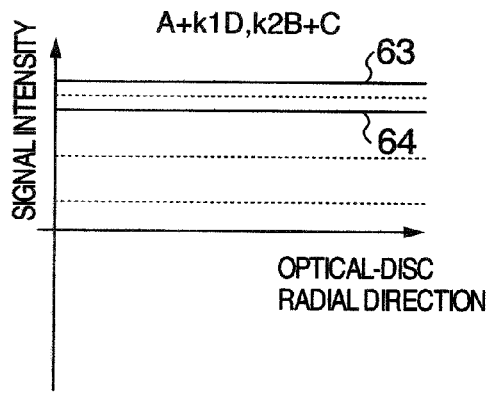
Figure 6D:
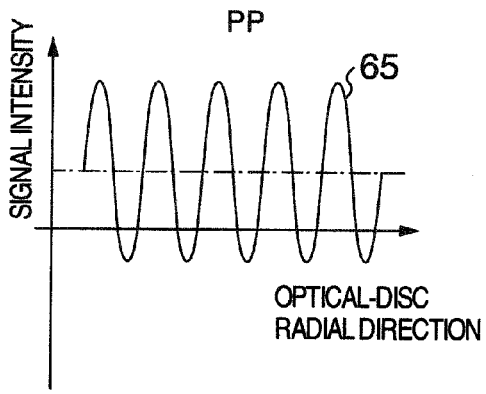
Figure 6E:
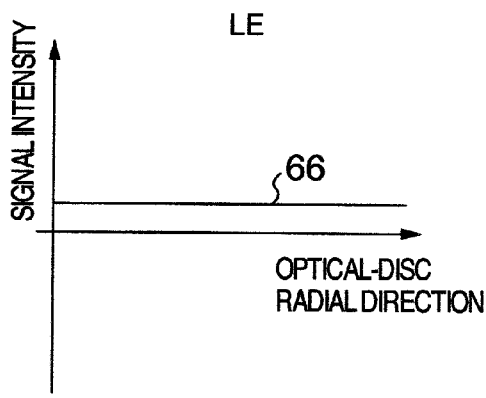
Figure 6F:
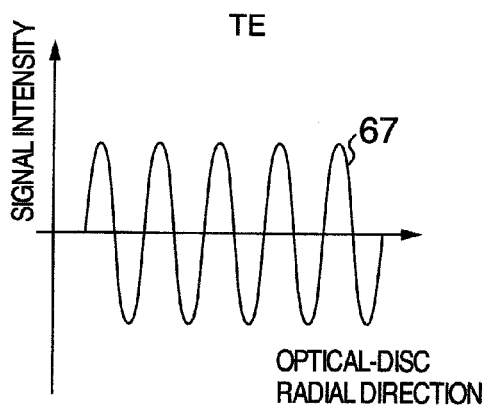

Next, referring to FIG. 5A to FIG. 5F and FIG. 6A to FIG. 6F, and using respective signals to be outputted, the explanation will be given below concerning the above-described TE signal. FIG. 5A to FIG. 5F illustrate the respective signals in the case where the amount of the objective-lens shift is equal to zero (i.e., FIG. 4A). Meanwhile, FIG. 6A to FIG. 6F illustrate the respective signals in the case where the amount of the objective-lens shift is equal to δ (i.e., FIG. 4B). Concretely, FIG. 5A and FIG. 6A illustrate a signal A 56, a signal B 57, a signal C 58, and a signal D 59, FIG. 5B and FIG. 6B illustrate the signal (A+B) 60 and the signal (C+D) 61, FIG. 5C and FIG. 6C illustrate the signal $(A+k_1 \times D)$ 63 and the signal $(k_2 \times B+C)$ 64, FIG. 5D and FIG. 6D illustrate the PP signal 65, FIG. 5E and FIG. 6E illustrate the LE signal 66, and FIG. 5F and FIG. 6F illustrate the TE signal 67. Also, the transverse axis of each signal denotes the radial direction of the optical disc 8, and the longitudinal axis of each signal denotes the magnitude of each signal.

First, referring to FIG. 5A to FIG. 5F, the explanation will be given below regarding the case where the amount of the objective-lens shift is equal to zero. With respect to the signal A56 and the signal C58 illustrated in FIG. 5A, the areas of the optical beam 50 are equal to each other as described above. Accordingly, the magnitudes of the DC components of the signals are equal to each other. Also, the area of the push-pull region P51 and the area of the push-pull region N52 are equal to each other. Consequently, the magnitudes of the AC components of the signals are equal to each other, and the AC components of the signals are in the opposite phases to each other.

With respect to the signal B57 and the signal D59, the areas of the optical beam 50 are equal to each other as described above. Accordingly, the magnitudes of the DC components of the signals are equal to each other. When compared with the signal A 56 and the signal C 58, the areas of the optical beam 50 are smaller. Consequently, the magnitudes of the DC components of the signal B 57 and the signal D 59 become smaller. Also, with respect to the signal B 57 and the signal D 59, the area of the push-pull region P 51 and the area of the push-pull region N 52 are equal to each other. Accordingly, the magnitudes of the AC components of the signals are equal to each other, and the AC components of the signals fall into the opposite phases to each other. When compared with the signal A 56 and the signal C 58, the area of the push-pull region P 51 and the area of the push-pull region N 52 are smaller. Consequently, the magnitudes of the AC components of the signal B 57 and the signal D 59 are smaller. Since the AC components of the signal A 56 and the signal B 57 are generated from the same push-pull region P 51, the AC components of the signals are in the same phases. Similarly, since the AC components of the signal C 58 and the signal D 59 are generated from the same push-pull region N 52, the AC components of the signals fall into the same phases.

The signal (A+B) 60 is an addition signal of the signal A 56 and the signal B 57. The signal (C+D) 61 is an addition signal of the signal C 58 and the signal D 59. The signal (A+B) 60 and the signal (C+D) 61 are the constitution elements of the Expression 2 for generating the PP signal. As illustrated in FIG. 5B, the signal (A+B) 60 and the signal (C+D) 61 assume the waveforms whose DC components are equal to each other, and whose AC components fall into the opposite phases to each other.

The signal $(A+k_1 \times D)$ 63 is an addition signal of the signal A 56 and the signal D 59 multiplied by the correction coefficient $k_1$. The signal $(k_2 \times B+C)$ 64 is an addition signal of the signal B 57 multiplied by the correction coefficient $k_2$ and the signal C 58. As illustrated in FIG. 5C, the signal $(A+k_1 \times D)$ 63 and the signal $(k_2 \times B+C)$ 64 turn out to be DC-component-alone-equipped signals. This is because the correction coefficients $k_1$ and $k_2$ are set so that the AC components are eliminated therefrom.

The PP signal 65 is a difference signal between the signal (A+B) 60 and the signal (C+D) 61. Accordingly, as illustrated in FIG. 5D, the PP signal 65 turns out to be the signal whose DC component is eliminated, but whose AC component is amplified.

The LE signal 66 is a difference signal between the signal $(A+k_1 \times D)$ 63 and the signal $(k_2 \times B+C)$ 64. Accordingly, as illustrated in FIG. 5E, the LE signal 66 turns out to be the signal whose DC component is eliminated.

The TE signal 67 is a difference signal between the PP signal 65 and the LE signal 66. Accordingly, in the case where the amount of the objective-lens shift is equal to zero, the TE signal 67 turns out to be the same signal as the PP signal 65 as is illustrated in FIG. 5F.

Next, referring to FIG. 6A to FIG. 6F, the explanation will be given below regarding the case where the amount of the objective-lens shift is equal to $\delta$. As described above, in the case where the amount of the objective-lens shift is equal to $\delta$, the areas of the optical beam 50 are decreased with respect to the signal A 56 and the signal B 57. Accordingly, as illustrated in FIG. 6A, the magnitudes of the DC components of the signals become smaller. Also, the area of the push-pull region P 51 and the area of the push-pull region N 52 remain unchanged. Consequently, the magnitudes of the AC components of the signal A 56 and the signal B 57 remain unchanged.

In the case where the amount of the objective-lens shift is equal to $\delta$, the areas of the optical beam 50 are increased with respect to the signal C 58 and the signal D 59. Accordingly, as illustrated in FIG. 6A, the magnitudes of the DC components of the signals become larger. Also, the area of the push-pull region P 51 and the area of the push-pull region N 52 remain unchanged. Consequently, the magnitudes of the AC components of the signal C 58 and the signal D 59 also remain unchanged.

As illustrated in FIG. 6B, the DC component of the signal (A+B) 60 becomes smaller. This is because the DC components of the signal A 56 and the signal B 57 are decreased. Conversely, the DC component of the signal (C+D) 61 becomes larger. This is because the DC components of the signal C 58 and the signal D 59 are increased. Both the AC component of the signal (A+B) 60 and the AC component of the signal (C+D) 61 remain unchanged.

As illustrated in FIG. 6C, the DC component of the signal $(A+k_1 \times D)$ 63 is increased. This is because the increase in the DC component of the signal D 59 multiplied by the correction coefficient $k_1$ is larger than the decrease in the DC component of the signal A 56. Conversely, the DC component of the signal $(k_2 \times B+C)$ 64 is decreased. This is because the decrease in the DC component of the signal B 57 multiplied by the correction coefficient $k_2$ is larger than the increase in the DC component of the signal C 58.

As illustrated in FIG. 6D, the offset is caused to occur in the PP signal 65. This is because there exists the difference between the DC component of the signal (A+B) 60 and that of the signal (C+D) 61. The AC components of the signals at this time remain unchanged.

The offset is caused to occur in the LE signal 66. This is because there exists the difference between the DC component of the signal $(A+k_1 \times D)$ 63 and that of the signal $(k_2 \times B+C)$ 64.

The correction coefficient $k_3$ is set so that the offset in the PP signal 65 and the offset in the LE signal 66 become equal to each other. As illustrated in FIG. 6F, this setting for the correction coefficient $k_3$ permits the TE signal 67 to become the same signal as the one illustrated in FIG. 5F even if the amount of the objective-lens shift is made equal to $\delta$. Namely, it can be said that the TE signal 67 assumes the waveform in which no offset is caused to occur even if the objective-lens shift is performed.

In the generation method for generating the TE signal in the present embodiment explained so far, the regions are set as are seen on the optical-signal generation element 9. This setting for the regions makes it possible to acquire the TE signal in which no offset is caused to occur even if the objective-lens shift is performed.

Figure 7:
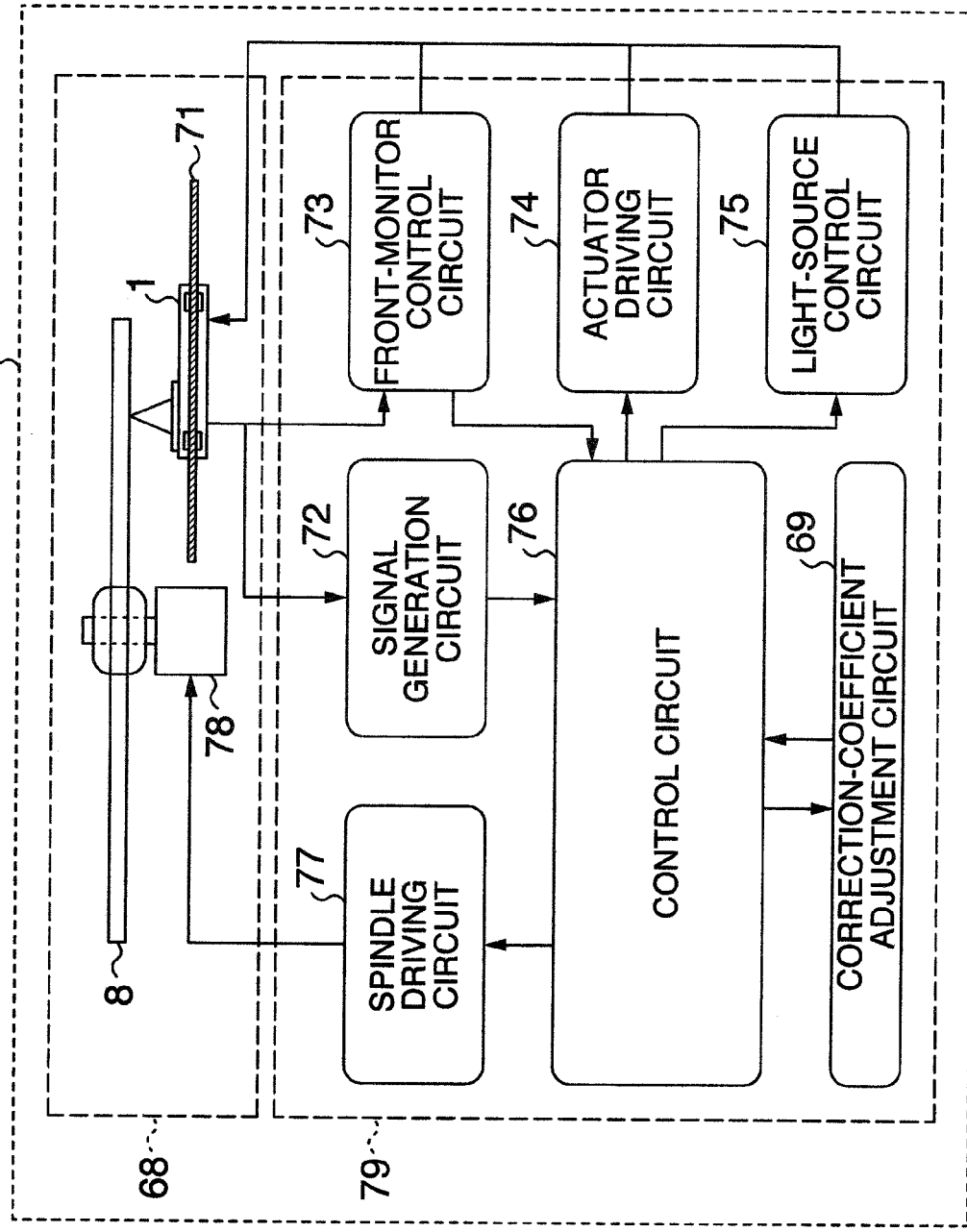
FIG. 7 is a schematic configuration diagram of an optical drive device 70 in the first embodiment.

Next, the explanation will be given below concerning an optical drive device 70 which mounts the optical head 1 thereon. FIG. 7 is a block diagram of the schematic configuration of the optical drive device 70. The optical drive device 70 is constituted from a device block 68 and a circuit block 79.

First, the device block 68 will be explained below. In the device block 68, the optical disc 8 is fixed to a spindle 78. This spindle 78 is equipped with a function of rotating the optical disc 8. Also, a guide bar 71 is provided inside the optical drive device 70. The optical head 1 is permitted to access a predetermined radial position of the optical disc 8 along this guide bar 71.

Next, the circuit block 79 will be explained below. When an information home appliance such as a PC issues, to the optical drive device 70, a reproduction-instructing command of reproducing information stored in the optical disc 8, this command is transmitted to a control circuit 76 inside the optical drive device 70. Having received the command, the control circuit 76 controls a spindle driving circuit 77 to drive the spindle 78, thereby starting the rotation of the optical disc 8.

Next, the control circuit 76 controls a light-source control circuit 75, thereby causing light beams to be lit up from the light source 2 in a reproduction light amount.

Next, the control circuit 76 controls an actuator driving circuit 74, thereby causing the actuator 7 of the optical head 1 to be driven in the normal direction of the optical disc 8. The signal detected from the optical detector 10 of the optical head 1 is transmitted to a signal generation circuit 72, where the FE signal is generated in accordance with the Expression 1. The control circuit 76 takes advantage of this FE signal to drive the actuator driving circuit 74, thereby performing the focusing onto a predetermined information plane of the optical disc 8.

After having performed the focusing, the control circuit 76 controls the signal generation circuit 72, thereby generating the PP signal, the LE signal, and the TE signal in accordance with the Expressions 2, 3, and 4, respectively. First, the control circuit 76 controls the actuator driving circuit 74, and displaces the actuator 7 in the radial direction of the optical disc 8 so that the offset for the PP signal becomes equal to zero. This displacement of the actuator 7 corresponds to the objective-lens shift.

Unlike FIG. 4A, assembly errors of a common optical head make it impossible to implement the complete coincidence between the center of the light beams 50 and the intersection point of the alternate long-and-short dashed line 20 and the alternate long-and-short dashed line 21 of the optical-signal generation element 9. On account of this situation, in the optical drive device 70, the objective-lens shift is performed so that the offset for the PP signal becomes equal to zero. This objective-lens shift allows the y-direction assembly error in FIG. 4A and FIG. 4B to be corrected out of the assembly errors of the common optical head.

Next, the control circuit 76 controls a correction-coefficient adjustment circuit 69, and individually adjusts the correction coefficients $k_1$ and $k_2$ so that the AC component of the LE signal becomes equal to its minimum value. The individual adjustment of the correction coefficients $k_1$ and $k_2$ allows the z-direction assembly error in FIG. 4A and FIG. 4B to be compensated out of the assembly errors of the optical-signal generation element 9. Namely, for example, if the optical-signal generation element 9 is shifted in the z direction, the area ratio between the push-pull region P 51 included within the region A 22 and the push-pull region N 52 included within the region D 25 turns out to change. Nevertheless, even if the area ratio has changed, the adjustment of the correction coefficients makes it possible to eliminate the AC component which has remained. This elimination of the AC component corresponds to the compensation for the z-direction assembly error of the optical-signal generation element 9.

Next, the control circuit 76 controls the actuator driving circuit 74, thereby causing the actuator 7 to be periodically operated in the radial direction of the optical disc 8. At this time, the control circuit 76 monitors the offset for the PP signal and the offset for the LE signal. Moreover, the control circuit 76 controls the correction-coefficient adjustment circuit 69, and adjusts the correction coefficient $k_3$ so that the amounts of these offsets become substantially equal to each other.

The execution of the above-described processing allows the assembly errors of the optical-signal generation element 9 to be absorbed by the optical drive device 70, thereby making it possible to acquire the excellent TE signal.

Next, the control circuit 76 controls the actuator driving circuit 74, thereby stopping the actuator 7 from being periodically operated. Moreover, the control circuit 76 takes advantage of the TE signal acquired, thereby performing the tracking onto a predetermined track of the optical disc 8.

After having performed the tracking, the control circuit 76 controls the signal generation circuit 72, thereby generating the RF signal in accordance with the Expression 5. It is desirable to take advantage of this RF signal, and to adjust operations such as the focusing and tilt of the objective lens 6 so that the reproduction performance (e.g., jitter and signal amplitude) becomes the most satisfying one.

The control circuit 76 transmits the acquired RF signal to the information home appliance such as a PC, thereby completing the reproduction-instructing command.

As described above, the device block 68 is controlled by the circuit block 79 in the optical drive device 70. This control configuration makes it possible to obtain desired reproduction information.

Also, the control circuit 76 is equipped with a function of causing the optical head 1 to be displaced to a predetermined radial position along the guide bar 71 depending on the requirements.

Also, the control circuit 76 is equipped with a function of always monitoring a signal obtained from the front monitor 5 by using a front-monitor control circuit 73, and controlling the light-source control circuit 75 so that the light amount of the light beams emitted from the light source 2 becomes equal to a predetermined value.

Also, the control circuit 76 is equipped with the following function: Namely, when the control circuit 76 receives a recording-instructing command of recording information into the optical disc 8, the control circuit 76 drives the light-source control circuit 75 after having performed the tracking as is the case with the above-described reproduction. In this way, the control circuit 76 controls the light amount of the light beams emitted from the light source 2, then recording the information into the optical disc 8.

So far, the explanation has been given concerning the embodiment of the optical drive device 70. The optical drive device 70, however, is not limited to this embodiment as long as the signal generation circuit 72 is mounted thereon.

As having been explained so far, according to the present invention, it becomes possible to provide the optical head and optical drive device that allows the generation of the TE signal from which the offset is eliminated even if the objective-lens shift has been performed.

Incidentally, the explanation of the optical-signal generation element 9 has been given selecting its example as the diffraction grating. The optical-signal generation element 9, however, is not limited to the diffraction grating. Namely, it is completely allowable as long as the element 9 is an optical element for dividing the region of the light beams with basically the same purpose as is indicated in the drawings. Also, it is also allowable to divide the optical detector itself as is the case with the optical-signal generation element in the present embodiment, and to cause the optical detector divided to be equipped with the functions of the above-described optical-signal generation element. Since, in this case, the optical-signal generation element can be omitted, the cost can be suppressed.

Embodiment 2

Next, referring to the drawings, the explanation will be given below concerning a second embodiment of the present invention. Here, the explanation will be given regarding a modified embodiment of the optical detector 10 in the first embodiment. An optical detector 80 in the second embodiment differs from the optical detector 10 in its circuit configuration. The explanation will be given concerning only the points in which the optical detector 80 differs from the optical detector 10.

Figure 8:
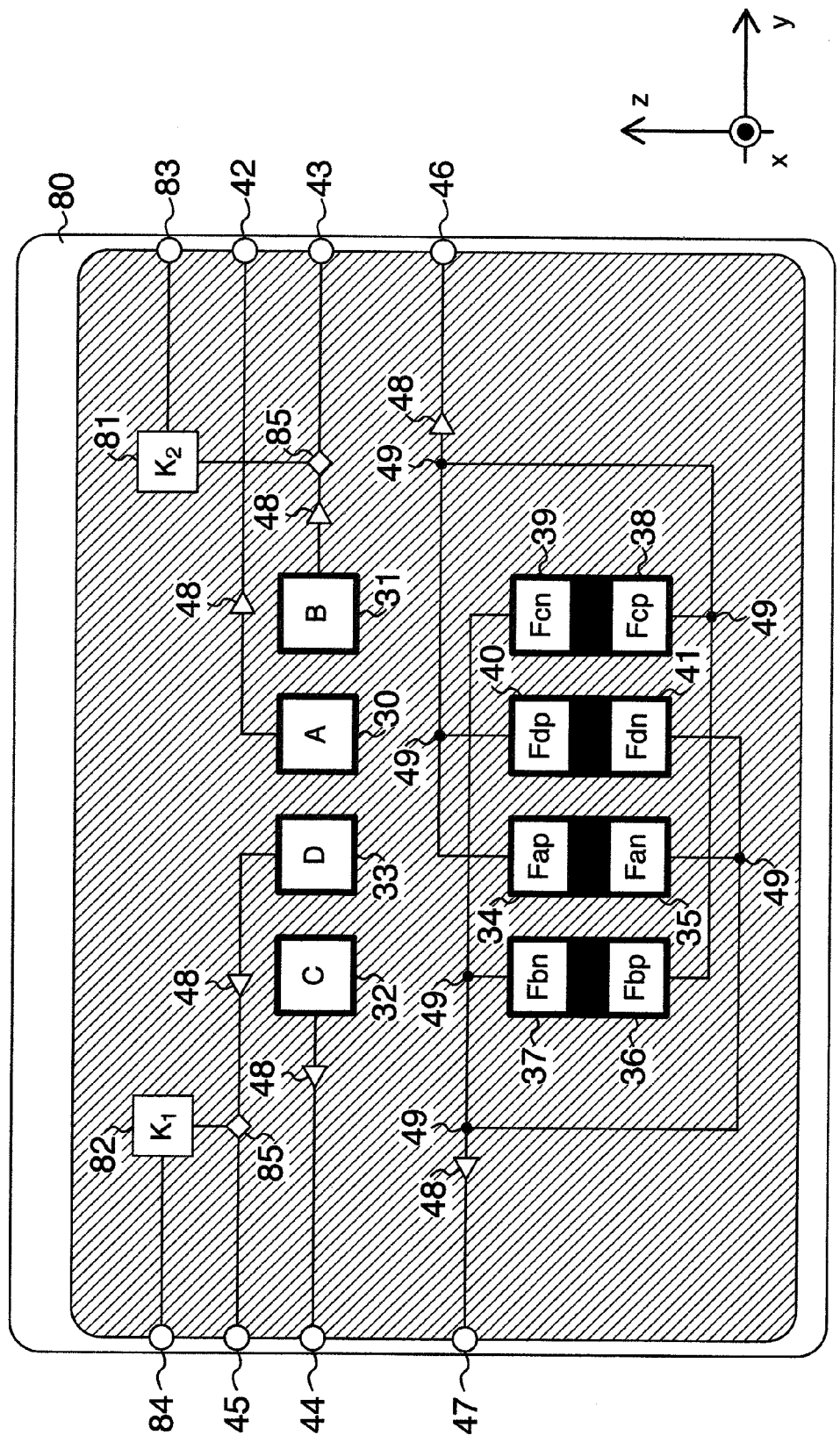
FIG. 8 is a schematic configuration diagram of an optical detector 80 in a second embodiment.

FIG. 8 is a schematic configuration diagram of the optical detector 80. As is the case with FIG. 3, FIG. 8 is the diagram acquired when the optical detector 80 is seen from the optical-beam splitter 3. The same reference numerals are affixed to the same configuration elements as those in the optical detector 10.

The optical detector 80 is constituted by the same light-receiving planes as those in the optical detector 10. The explanation about the same points will be omitted below.

The light-receiving plane B31 is a light-receiving plane for receiving the light beams B+1. The light-receiving plane B31 generates an electric current corresponding to the light amount of the light beams. Next, the plane B31 outputs, as a signal, a voltage corresponding to the light amount of the light beams from a terminal B 43 via the current-voltage conversion element 48 and a branch point 85. In general, the branch point 85 is a point for causing one and the same signal to branch into two different signals. Meanwhile, a signal, which is caused to branch at the branch point 85, is multiplied by the correction coefficient $k_2$ via a coefficient circuit 81. Moreover, a voltage, which is multiplied by the correction coefficient $k_2$ in correspondence with the light amount of the light beams, is outputted as a signal from a terminal $k_2$B 83.

The light-receiving plane D 33 is a light-receiving plane for receiving the light beams D+1. The light-receiving plane D 33 generates an electric current corresponding to the light amount of the light beams. Next, the plane D 33 outputs, as a signal, a voltage corresponding to the light amount of the light beams from a terminal D45 via the current-voltage conversion element 48 and the branch point 85. Meanwhile, a signal, which is caused to branch at the branch point 85, is multiplied by the correction coefficient $k_1$ via a coefficient circuit 82. Moreover, a voltage, which is multiplied by the correction coefficient $k_1$ in correspondence with the light amount of the light beams, is outputted as a signal from a terminal $k_1$D 84.

As described above, the signal ($k_2 \times$B) and the signal ($k_1 \times$D), which are necessary for the Expression 3, are generated by the optical detector 80. Outputting the necessary signals from the optical detector 80 in this way makes it possible to facilitate the configuration of the signal-generation processing circuit. This configuration including the optical detector 80 allows implementation of a merit of becoming capable of assuming the compatibility with the optical drive devices which have been used for the DVD and CD up to the present.

Also, the coefficient circuits 81 and 82 are so constituted as to be able to adjust their amplification ratios from the outside. This configuration makes it possible to correct the z-direction assembly error in FIG. 4A and FIG. 4B out of the assembly errors of the optical-signal generation element 9.

Embodiment 3

Next, referring to the drawings, the explanation will be given below concerning a third embodiment of the present invention. Here, the explanation will be given regarding a modified embodiment of the optical head 1 in the first embodiment. An optical head 91 in the third embodiment differs from the optical head 1 in a point that the two units of optical parts, i.e., the optical-signal generation element 9 and the optical detector 10, are replaced.

Figure 9:
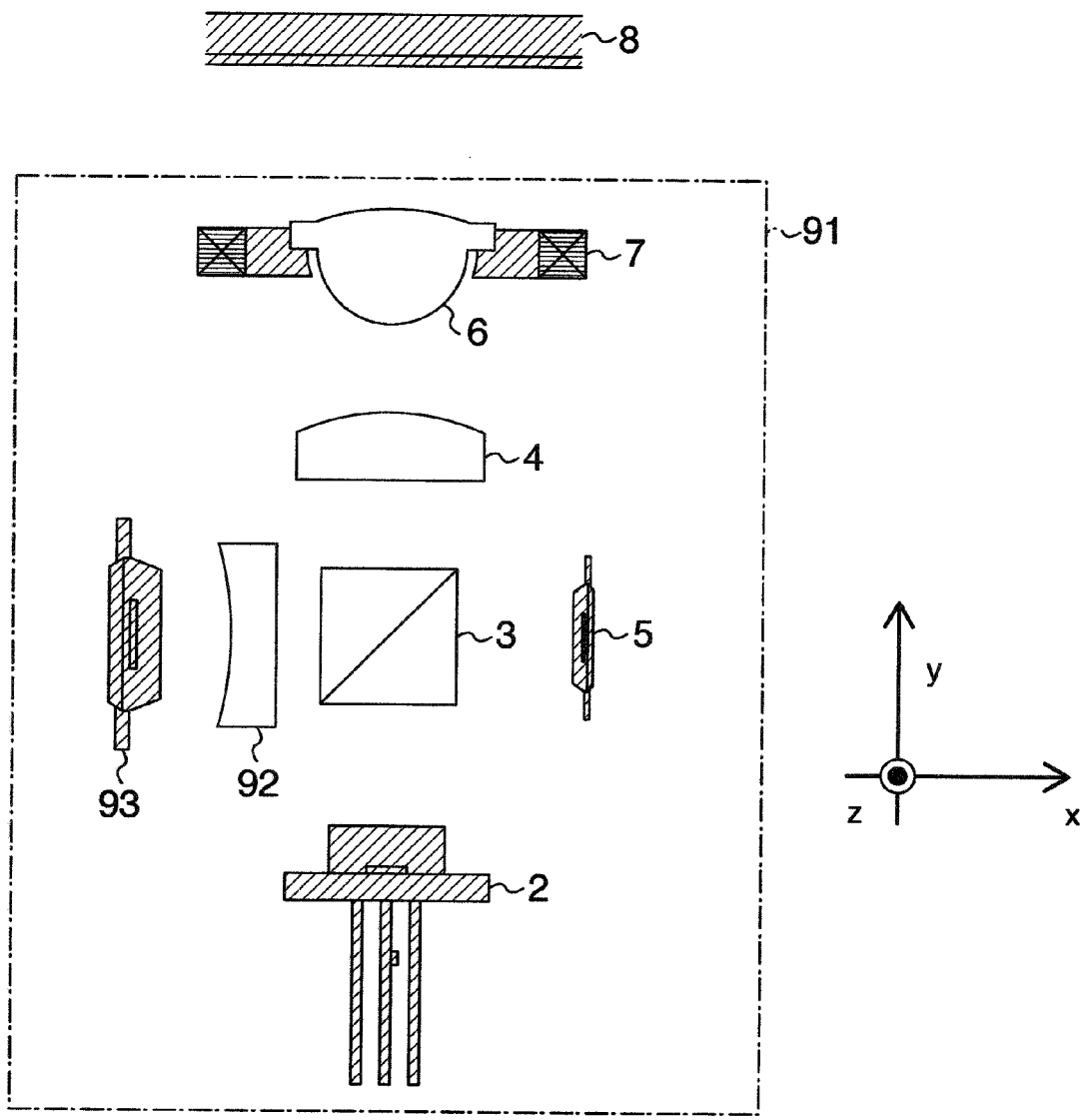
FIG. 9 is a schematic configuration diagram of an optical head 91 in a third embodiment.

FIG. 9 is a schematic configuration diagram of the optical head 91 in the third embodiment. The optical head 91 differs from the optical head 1 in the point that a detection lens 92 and an optical detector 93 are mounted thereon. The explanation will be given concerning only the different point.

As is the case with the explanation given in the first embodiment, the light beams reflected by the optical disc 8 attain to the optical-beam splitter 3. Furthermore, after being reflected by the optical-beam splitter 3, the light beams are detected on light-receiving planes of the optical detector 93 via the detection lens 92.

The detection lens 92 is an optical element for adding an astigmatic aberration, which is oriented in a 135 degree direction on the y-z plane, to the light beams which have entered the detection lens 92. The detection lens 92 is set up in order to generate the FE signal based on the astigmatic-aberration scheme. An optical element like this can be implemented using a cylindrical lens or the like.

Figure 10:
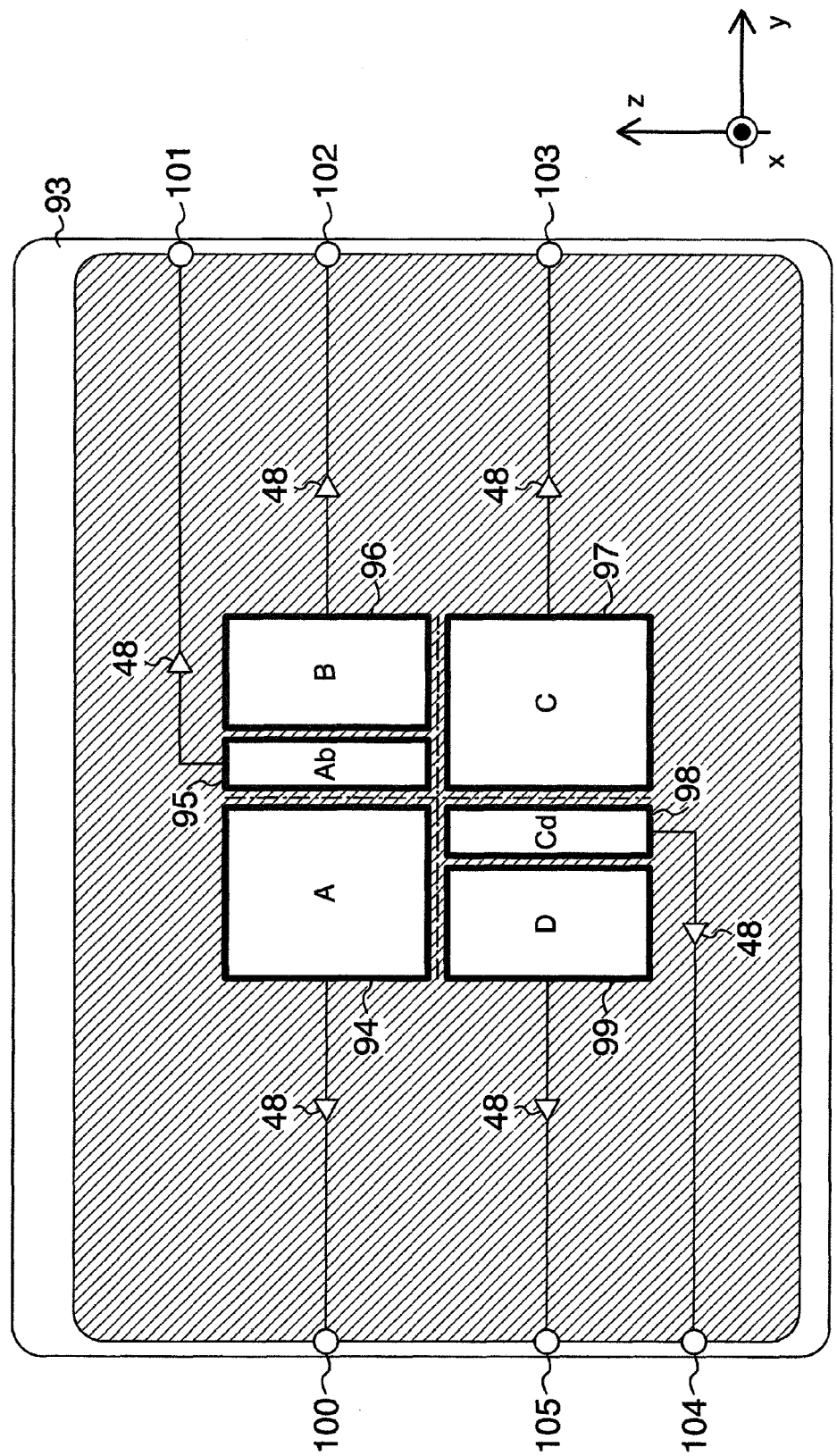
FIG. 10 is a schematic configuration diagram of an optical detector 93 in the third embodiment.

FIG. 10 is a schematic configuration diagram of the optical detector 93. FIG. 10 is the diagram acquired when the optical detector 93 is seen from the optical-beam splitter 3.

The optical detector 93 is constituted by six units of light-receiving planes, i.e., a light-receiving plane A 94, a light-receiving plane Ab 95, a light-receiving plane B 96, a light-receiving plane C 97, a light-receiving plane Cd 98, and a light-receiving plane D 99.

Each of the light-receiving plane A94, the light-receiving plane Ab95, the light-receiving plane B96, the light-receiving plane C97, the light-receiving plane Cd98, and the light-receiving plane D99 generates an electric current corresponding to the light amount of the light beams. Next, each plane outputs, as a signal, a voltage corresponding to the light amount of the light beams via the current-voltage conversion element 48 from each of a terminal A 100, a terminal Ab 101, a terminal B 102, a terminal C 103, a terminal Cd 104, and a terminal D 105.

Next, the explanation will be given below regarding calculations whereby signals needed for the optical drive device are generated from the signals outputted by the optical detector 93. The FE signal, the PP signal, the LE signal, the TE signal, and the RF signal are generated from the following Expression 6, Expression 7, Expression 8, Expression 9, and Expression 10, respectively:

$$FE = (A+C) - (Ab+B+Cd+D) \qquad \text{(Expression 6)}$$

$$PP = (A+Ab+B) - (C+Cd+D) \qquad \text{(Expression 7)}$$

$$LE = (k_2 \times B + C + Cd) - (A + Ab + k_1 \times D) \qquad \text{(Expression 8)}$$

$$TE = PP - k_3 \times LE \qquad \text{(Expression 9)}$$

$$RF = (A+Ab+B+C+Cd+D) \qquad \text{(Expression 10)}$$

In the above-described Expressions, A or the like is equivalent to a signal outputted from a terminal A100. Basically the same equivalences will also be given for the other signals. Also, in the following explanation, "A or the like" will be described as "signal A or the like".

The above-described $k_1$, $k_2$, and $k_3$, which are correction coefficients, are of the same functions as those explained in the first embodiment. In the present embodiment, the signal D and the signal B have been multiplied by the correction coefficient $k_1$ and the correction coefficient $k_2$, respectively. This multiplication is performed so that, in the signal intensity, the signals from the light-receiving plane B96 and light-receiving plane D99 whose areas are smaller become substantially equal to the signals from the light-receiving plane A94 and light-receiving plane Ab95 whose areas are larger, and the signals from the light-receiving plane C97 and light-receiving plane Cd98 whose areas are larger. This kind of multiplication, however, is not limited to this multiplication. Namely, conversely, it is also allowable to multiply the signal (A+Ab) and (C+Cd) by the correction coefficients $k_1$ and $k_2$, respectively. Also, the correction coefficients $k_1$ and $k_2$ are set so that the AC components of the signals (A+Ab+$k_1$×D) and ($k_2$×B+C+Cd) become equal to zero. This setting allows the amplitude of the PP signal to be employed as the amplitude of the TE signal with no change made thereto, thereby successfully exhibiting an effect of being capable of acquiring the TE signal without reducing the amplitude of the TE signal. This kind of setting, however, is not necessarily limited to this setting. Namely, it is quite satisfying if, ultimately, the offset caused to occur in the TE signal has been successfully eliminated. Consequently, the correction coefficients $k_1$ and $k_2$ are not necessarily required to be the correction coefficients which permit the AC components to become completely equal to zero.

The generation of the FE signal based on the astigmatic-aberration scheme has been publicly known. Accordingly, the detailed explanation thereof will be omitted here. The astigmatic-aberration-scheme-based generation of the FE signal is made implementable by outputting the difference between the diagonal components. On account of this, the Expression 6 is constituted from the difference between the diagonal components, i.e., the signal (A+C) and the signal (Ab+B+Cd+D).

Figure 11:
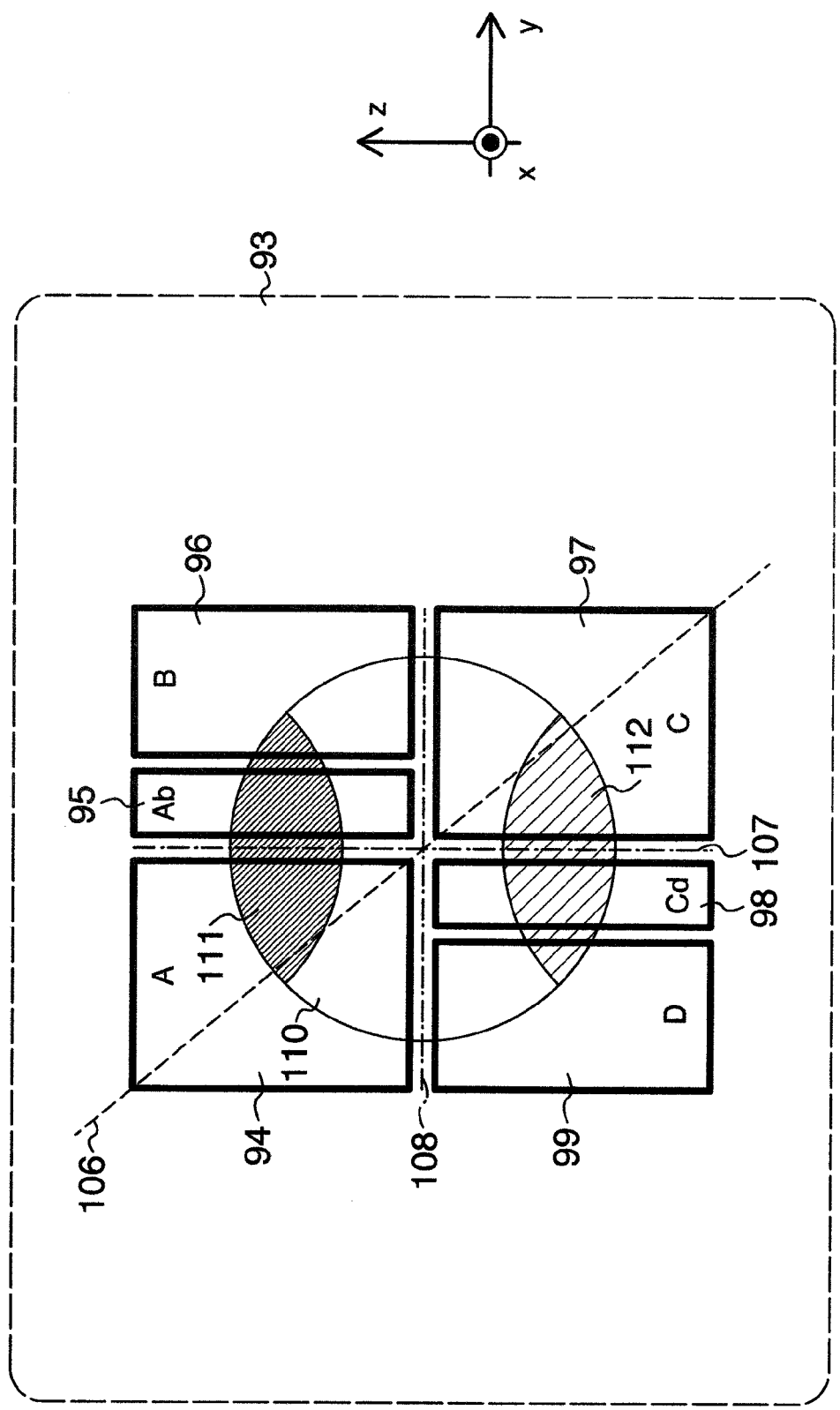
FIG. 11 is a schematic configuration diagram for explaining the relationship between the optical detector 93 in the third embodiment and an incident light beam 110 entering the optical detector 93.

Next, referring to FIG. 11, the explanation will be given below regarding the generation of the TE signal. FIG. 11 is a schematic configuration diagram for explaining the relationship between the optical detector 93 and light beams 110 which have entered the optical detector 93. As is the case with FIG. 10, FIG. 11 is the diagram acquired when the optical detector 93 is seen from the optical-beam splitter 3.

The cross-section of the light beams which are to enter the optical detector 93 is illustrated as the light beams 110. The tracks existing on the optical disc 8 cause push-pull images to occur on the light beams 110. The regions where these push-pull images are caused to occur are illustrated as a push-pull region P 111 and a push-pull region N112. The push-pull region P 111 and the push-pull region N 112 are the following regions: Namely, if the optical spot existing on the optical disc 8 is displaced in the radial direction of the optical disc 8, the light amounts in the push-pull regions flicker in opposite phases to each other.

Here, the astigmatic aberration oriented in the 135 degree direction in the drawing is added to the light beams. Accordingly, the light beams form images which are line-symmetric to each other with reference to a dashed line 106 for indicating the 135 degree direction in the drawing. As a result, in comparison with the light beams 50 in the first embodiment, the push-pull region P111 and the push-pull region N112 are positioned on the upper side and the lower side in the drawing, respectively. Also, for the same reason, an alternate long-and-short dashed line 107 and an alternate long-and-short dashed line 108 are equivalent to the radial direction of the optical disc 8 and the track direction of the optical disc 8, respectively.

Also, the intersection point of the alternate long-and-short dashed line 107 and the alternate long-and-short dashed line 108 is assumed to be the center of the optical detector 93. On account of this, when assembling the optical head, it is advisable to adjust the optical detector 93 so that the intersection point of the alternate long-and-short dashed line 107 and the alternate long-and-short dashed line 108 and the center of the light beams 110 which are to enter the optical detector 93 coincide with each other.

By the way, giving consideration to the astigmatic-aberration-attributed change in the images of the light beams 110 which are to enter the optical detector 93 indicates the following situation: Namely, the region resulting from the superposition of the light-receiving plane A 94 and the light-receiving plane Ab 95, the region of the light-receiving plane B 96, the region resulting from the superposition of the light-receiving plane C 97 and the light-receiving plane Cd 98, and the region of the light-receiving plane D 99 correspond to the region A 22, the region B 23, the region C 24, and the region D 25, respectively. Namely, it can be said that, as was explained in the first embodiment, the stable TE signal can also be generated using the signals acquired from the optical head 91.

The price of an optical detector is approximately determined in dependence with the chip size including the light-receiving planes. In the optical detector 93, unlike the optical detector 10, the light beams are not divided in the geometrical-optics-based manner using the optical-signal generation element 9. This feature makes it possible to downsize the chip size of the light-receiving planes, thereby allowing an expectation of becoming capable of making the part inexpensive.

As having been explained so far, the optical head 91 makes it possible to generate the stable TE signal, and to use the inexpensive optical detector.

Incidentally, in FIG. 10, the optical detector 93 has been so configured as to output the respective signals without connecting the signals to each other. It is of course completely allowable, however, that output terminals are newly provided such that the terminals are connected to each other depending on the requirements.

Embodiment 4

Next, referring to the drawings, the explanation will be given below concerning a fourth embodiment of the present invention. Here, the explanation will be given regarding a modified embodiment of the optical-signal generation element 9 in the first embodiment. An optical-signal generation element 120 in the fourth embodiment differs from the optical-signal generation element 9 in a point of the region-dividing way in which the region is to be divided. Hereinafter, the explanation will be given concerning only the point in which the optical-signal generation element 120 differs from the optical-signal generation element 9.

Figure 12:
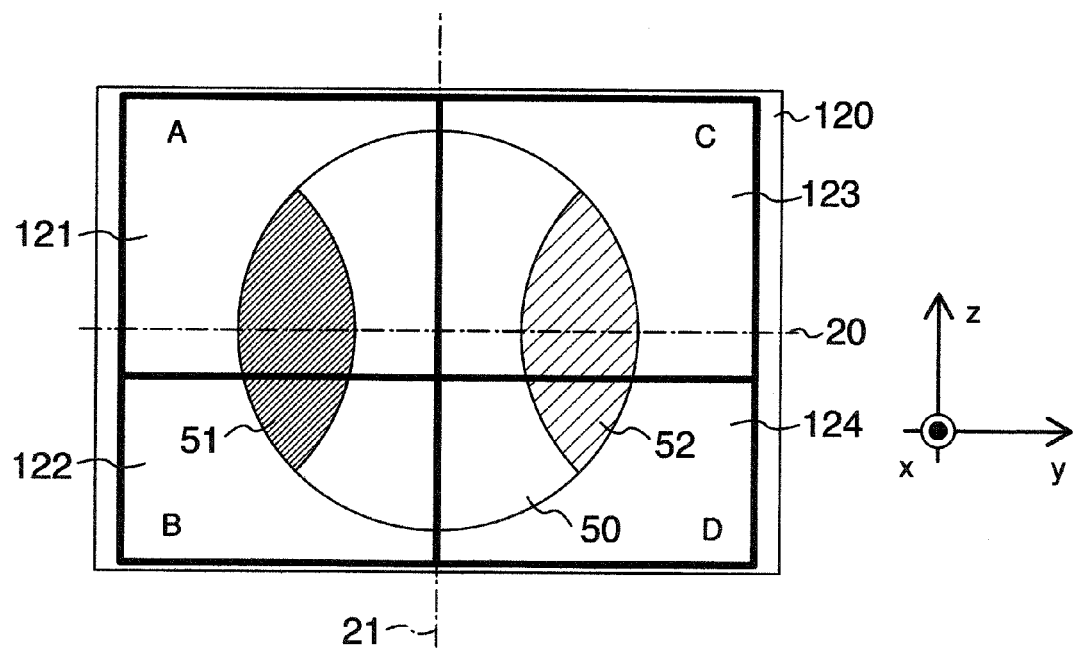
FIG. 12 is a schematic configuration diagram of an optical-signal generation element 120 in a fourth embodiment.

FIG. 12 is a schematic configuration diagram of the optical-signal generation element 120. As is the case with FIG. 3, FIG. 12 is the diagram acquired when the optical-signal generation element 120 is seen from the optical-beam splitter 3. Also, similarly to FIG. 4A, the light beams 50 which are to enter the optical-signal generation element 120 are illustrated. Also, the alternate long-and-short dashed line 20 and the alternate long-and-short dashed line 21 are equivalent to the radial direction of the optical disc 8 and the track direction of the optical disc 8, respectively. Also, the intersection point of the alternate long-and-short dashed line 20 and the alternate long-and-short dashed line 21 is assumed to be the center of the optical-signal generation element 120.

Namely, the following condition is desirable when assembling the optical head 1: Namely, the optical-signal generation element 120 is adjusted in the y and z directions so that the intersection point of the alternate long-and-short dashed line 20 and the alternate long-and-short dashed line 21 and the center of the light beams 50 which are to enter the optical-signal generation element 120 coincide with each other.

By the way, the optical-signal generation element 120 is an optical element for dividing the light beams, which have entered the generation element 120, on each its predetermined-region basis. This division of the light beams is performed in order to generate the TE signal. Here, the explanation will be given selecting an example where the generation element 120 is assumed to be a diffraction grating in which the settings for the diffraction grating's grooves are different on each its region basis. Of course, the generation element 120 is not limited to the diffraction grating.

The light beams which have entered each region of the diffraction grating (i.e., optical-signal generation element 120) are divided into ±1st-order diffraction light beams. The optical-signal generation element 120 is constituted by four units of regions, i.e., a region A 121, a region B 122, a region C 123, and a region D 124.

The region A 121 and the region B 122, and the region C 123 and the region D124 are divided by the alternate long-and-short dashed line 21 in the y direction.

The region A 121 and the region C 123, and the region B 122 and the region D 124 are divided in the z direction by a line which is parallel to the alternate long-and-short dashed line 20. The boundary between the up and down regions is offset in parallel to the alternate long-and-short dashed line 20, and by a predetermined amount therefrom in the downward direction in the drawing. Of course, the boundary may also be offset in the upward direction.

The optical-signal generation element 120 differs from the optical-signal generation element 9 in the following point: Namely, the region C123 and the region D124 are inverted to each other in the up-and-down direction in the drawing.

It is assumed that the signal generated from the light beams divided on the region A121 is a signal A, the signal generated from the light beams divided on the region B 122 is a signal B, the signal generated from the light beams divided on the region C 123 is a signal C, and the signal generated from the light beams divided on the region D 124 is a signal D. At this time, the PP signal, the LE signal, and the TE signal are generated from the above-described Expression 2, Expression 3, and Expression 4, respectively. The region-dividing way in which the region is divided differs from the region-dividing way employed in the first embodiment. Nevertheless, the excellent TE signal in which no offset is caused to occur can be generated from basically the same mechanism as was explained in the first embodiment.

By the way, the divided regions of the optical-signal generation element 120 are equipped with the symmetry. As a result, even if the optical-signal generation element 120 is shifted in the up-and-down direction in the drawing, the relationship of the area ratio is maintained between the push-pull region P51 and the push-pull region N52 which are included within the region A121 and the region D124, and the region B 122 and the region C 123. This feature makes it possible to unify the correction coefficient $k_1$ and the correction coefficient $k_2$ in the Expression 3. Namely, unlike the explanation given in the first embodiment, the correction coefficient $k_1$ and the correction coefficient $k_2$ are not required to be individually adjusted in the optical drive device. This feature makes it possible to shorten the set-up time of the optical drive device.

As having been explained so far, in the case where the optical-signal generation element 120 is used, it becomes possible to generate the stable TE signal similarly to the case where the optical-signal generation element 9 is used. Moreover, it becomes possible to shorten the set-up time of the optical drive device as compared with the case where the optical-signal generation element 9 is used.

Incidentally, the optical detector in the case where the optical-signal generation element 120 is used differs from the optical detector 10 in its signal-outputting configuration of the light-receiving planes for generating the FE signal. Consequently, this optical detector can be implemented by changing the signal-output-connecting way on the basis of the knife-edge-scheme-based principle.

Embodiment 5

Next, referring to the drawings, the explanation will be given below concerning a fifth embodiment of the present invention. Here, the explanation will be given regarding a modified embodiment of the optical-signal generation element 9 in the first embodiment. An optical-signal generation element 130 in the fifth embodiment differs from the optical-signal generation element 9 in the point of the region-dividing way in which the region is to be divided. Hereinafter, the explanation will be given concerning only the point in which the optical-signal generation element 130 differs from the optical-signal generation element 9.

Figure 13:
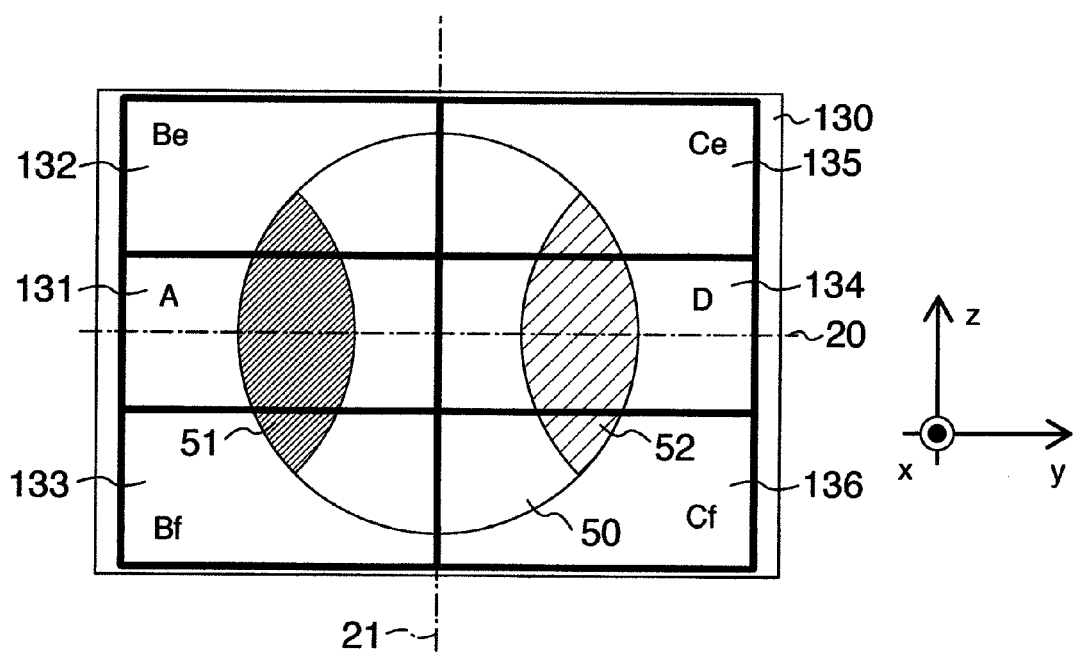
FIG. 13 is a schematic configuration diagram of an optical-signal generation element 130 in a fifth embodiment.

FIG. 13 is a schematic configuration diagram of the optical-signal generation element 130. As is the case with FIG. 3, FIG. 13 is the diagram acquired when the optical-signal generation element 130 is seen from the optical-beam splitter 3. Also, similarly to FIG. 4A, the light beams 50 which are to enter the optical-signal generation element 130 are illustrated. Also, the alternate long-and-short dashed line 20 and the alternate long-and-short dashed line 21 are equivalent to the radial direction of the optical disc 8 and the track direction of the optical disc 8, respectively. Also, the intersection point of the alternate long-and-short dashed line 20 and the alternate long-and-short dashed line 21 is assumed to be the center of the optical-signal generation element 130.

Namely, the following condition is desirable when assembling the optical head 1: Namely, the optical-signal generation element 130 is adjusted in the y and z directions so that the intersection point of the alternate long-and-short dashed line 20 and the alternate long-and-short dashed line 21 and the center of the light beams 50 which are to enter the optical-signal generation element 130 coincide with each other.

By the way, the optical-signal generation element 130 is an optical element for dividing the light beams, which have entered the generation element 130, on each its predetermined-region basis. This division of the light beams is performed in order to generate the TE signal. Here, the explanation will be given selecting an example where the generation element 130 is assumed to be a diffraction grating in which the settings for the diffraction grating's grooves are different on each its region basis. Of course, the generation element 130 is not limited to the diffraction grating.

The light beams which have entered each region of the diffraction grating (i.e., optical-signal generation element 130) are divided into ±1st-order diffraction light beams. The optical-signal generation element 130 is constituted by six units of regions, i.e., a region A 131, a region Be 132, a region Bf 133, a region Ce 135, a region Cf 136, and a region D 134.

The region A 131, the region Be 132, and the region Bf 133, and the region Ce 135, the region Cf 136, and the region D 134 are divided by the alternate long-and-short dashed line 21 in the y direction.

Also, the region A 131 and the region D 134, and the region Be 132 and the region Ce 135 are divided in the z direction by a line which is parallel to the alternate long-and-short dashed line 20. The boundary between the up and down regions is offset in parallel to the alternate long-and-short dashed line 20, and by a predetermined amount therefrom in the upward direction in the drawing.

Also, the region A131 and the region D134, and the region Bf133 and the region Cf136 are divided in the z direction by a line which is parallel to the alternate long-and-short dashed line 20. The boundary between the up and down regions is offset in parallel to the alternate long-and-short dashed line 20, and by a predetermined amount therefrom in the downward direction in the drawing.

The optical-signal generation element 130 differs from the optical-signal generation element 9 in the point that the number in which the region is divided is changed from the four units to the six units.

By the way, it is assumed that the signal generated from the light beams divided on the region A131 is a signal A, the signal generated from the light beams divided on the region Be132 is a signal Be, the signal generated from the light beams divided on the region Bf133 is a signal Bf, the signal generated from the light beams divided on the region Ce135 is a signal Ce, the signal generated from the light beams divided on the region Cf136 is a signal Cf, and the signal generated from the light beams divided on the region D134 is a signal D. At this time, the PP signal, the LE signal, and the TE signal are generated from the following Expression 11, Expression 12, and Expression 13, respectively:

$$PP=(A+Be+Bf)-(Ce+Cf+D) \quad \text{(Expression 11)}$$

$$LE=(k_1 \times (Be+Bf)+D)-(A+k_1 \times (Ce+Cf)) \quad \text{(Expression 12)}$$

$$TE=PP-k_3 \times LE \quad \text{(Expression 13)}$$

In the above-described Expressions, A or the like is equivalent to the signal A. The signal A, the signal Be, and the signal Bf are regions which correspond to the region A 22 and the region B 23 of the optical-signal generation element 9. The signal Ce, the signal Cf, and the signal D are regions which correspond to the region C 24 and the region D 25 of the optical-signal generation element 9. As a result, the PP signal in the Expression 11 becomes the same signal as the PP signal in the Expression 2.

Also, one of the elements of the LE signal is an addition signal of the signal A and the signals (Ce+Cf) multiplied by the correction coefficient $k_1$. In view of the point that the AC components are in the opposite phases to each other, the correction coefficient $k_1$ is set so that the area of the push-pull region P51 included within the region A131 and the area of the push-pull region N52 included within the region Ce135 and the region Cf136 become equal to each other. This setting for the correction coefficient $k_1$ makes it possible to eliminate the AC component of the signal (A+$k_1 \times$(Ce+Cf)).

Also, the other element of the LE signal is an addition signal of the signal D and the signals (Be+Bf) multiplied by the correction coefficient $k_1$. In view of the point that the AC components are in the opposite phases to each other, the correction coefficient $k_1$ is set so that the area of the push-pull region N52 included within the region D134 and the area of the push-pull region P51 included within the region Be132 and the region Bf133 become equal to each other. This setting for the correction coefficient $k_1$ makes it possible to eliminate the AC component of the signal ($k_1 \times$(Be+Bf)+D). As is seen from the drawing, the correction coefficients become equal to the same value. Namely, this fact shows that, as is the case with the first embodiment, the LE signal acquired turns out to be a signal whose AC component is lost. Namely, the excellent TE signal in which no offset is caused to occur can be generated from basically the same mechanism as was explained in the first embodiment.

Also, the divided regions of the optical-signal generation element 130 are equipped with the symmetry as is the case with the optical-signal generation element 120. Accordingly, as is indicated by the Expression 12, the single correction coefficient $k_1$ alone is effective enough to acquire the LE signal. This feature makes it possible to shorten the set-up time of the optical drive device in the optical-signal generation element 130 as well.

As having been explained so far, in the case where the optical-signal generation element 130 is used, it becomes possible to generate the stable TE signal. Moreover, it becomes possible to shorten the set-up time of the optical drive device.

Incidentally, the optical detector in the case where the optical-signal generation element 130 is used differs from the optical detector 10 in its signal-outputting configuration of the light-receiving planes. Consequently, in order to generate at least the TE signal, it is advisable to change this optical detector to an optical detector which is capable of outputting the signals needed for the Expression 11, the Expression 12, and the Expression 13.

Embodiment 6

Next, referring to the drawings, the explanation will be given below concerning a sixth embodiment of the present invention. Here, the explanation will be given regarding a modified embodiment of the optical-signal generation element 120 in the fourth embodiment.

The areas of a push-pull region P and a push-pull region N of the light beams reflected by an optical disc depends on the track pitch of the optical disc. In view of this fact, in the sixth embodiment, the explanation will be given concerning an optical-signal generation element 140 which corresponds to an optical disc whose track pitch is wide. Incidentally, the wide-track-pitch-equipped optical disc refers to a disc such as, e.g., CD or DVD-RAM.

Figure 14:
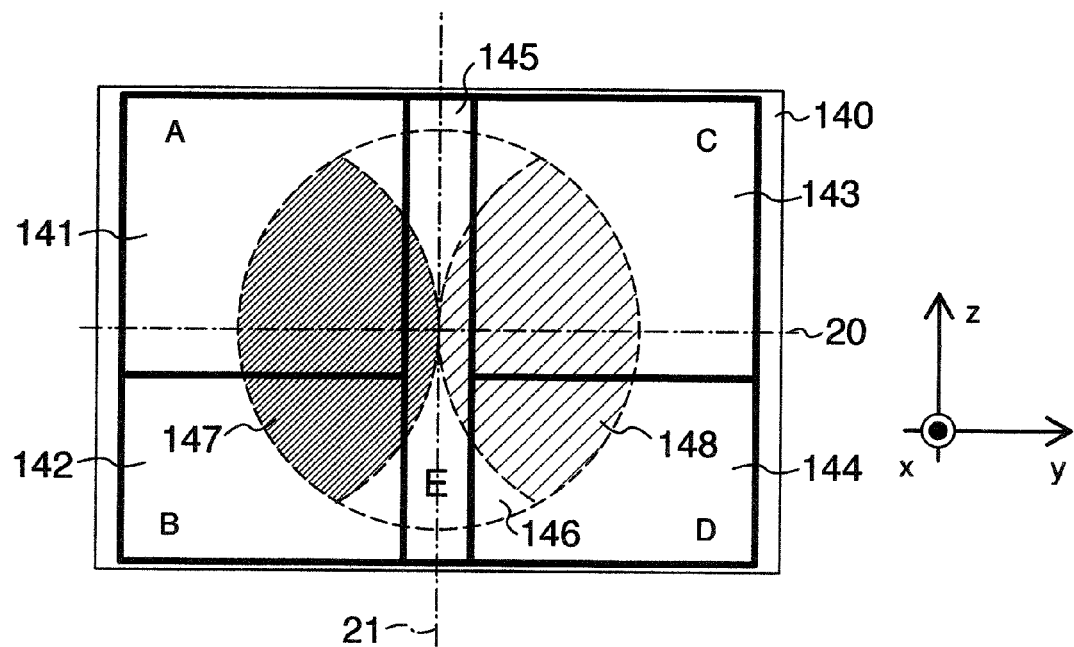
FIG. 14 is a schematic configuration diagram of an optical-signal generation element 140 in a sixth embodiment.

FIG. 14 is a schematic configuration diagram of the optical-signal generation element 140. As is the case with FIG. 3, FIG. 14 is the diagram acquired when the optical-signal generation element 140 is seen from the optical-beam splitter 3. Also, light beams 146 are illustrated which are to enter the optical-signal generation element 140, and which are reflected by a wide-track-pitch-equipped optical disc. Also, the alternate long-and-short dashed line 20 and the alternate long-and-short dashed line 21 are equivalent to the radial direction of the optical disc and the track direction of the optical disc, respectively. Also, the intersection point of the alternate long-and-short dashed line 20 and the alternate long-and-short dashed line 21 is assumed to be the center of the optical-signal generation element 140.

Namely, the following condition is desirable when assembling the optical head 1: Namely, the optical-signal generation element 140 is adjusted in the y and z directions so that the intersection point of the alternate long-and-short dashed line 20 and the alternate long-and-short dashed line 21 and the center of the light beams 146 which are to enter the optical-signal generation element 140 coincide with each other.

Incidentally, as described above, in the wide-track-pitch-equipped optical disc, the areas of a push-pull region P 147 and a push-pull region N 148 of the light beams 146 become larger as compared with those of the light beams 50.

By the way, the optical-signal generation element 140 is an optical element for dividing the light beams, which have entered the generation element 140, on each its predetermined-region basis. This division of the light beams is performed in order to generate the TE signal. Here, the explanation will be given selecting an example where the generation element 140 is assumed to be a diffraction grating in which the settings for the diffraction grating's grooves are different on each its region basis. Of course, the generation element 140 is not limited to the diffraction grating.

The light beams which have entered each region of the diffraction grating (i.e., optical-signal generation element 140) are divided into ±1st-order diffraction light beams. The optical-signal generation element 140 is constituted by five units of regions, i.e., a region A 141, a region B 142, a region C 143, a region D 144, and a region E 145. The optical-signal generation element 140 differs from the optical-signal generation element 120 in the point that the region E 145 is set up therein.

As is illustrated in the drawing, the region E 145, which includes the alternate long-and-short dashed line 21, is set up in the optical-signal generation element 140. Also, the region A 141 and the region C 143, and the region B 142 and the region D 144 are divided in the z direction by a line which is parallel to the alternate long-and-short dashed line 20. The boundary between the up and down regions is offset in parallel to the alternate long-and-short dashed line 20, and by a predetermined amount therefrom in the downward direction in the drawing.

Here, it is assumed that the signal generated from the light beams divided on the region A141 is a signal A, the signal generated from the light beams divided on the region B142 is a signal B, the signal generated from the light beams divided on the region C143 is a signal C, and the signal generated from the light beams divided on the region D144 is a signal D. At this time, the PP signal, the LE signal, and the TE signal are generated from the above-described Expression 2, Expression 3, and Expression 4, respectively. As a result, the excellent TE signal in which no offset is caused to occur can be generated from basically the same mechanism as was explained in the first embodiment.

When the objective-lens shift is performed, the light beams 146 are displaced in the y direction in the drawing. The set-up of the region E 145 prevents the push-pull region N 148 from entering the region A 141 even if the objective-lens shift is performed. This is the point which is devised so that the performance of the TE signal can be ensured even if the objective-lens shift is performed.

Figure 15:
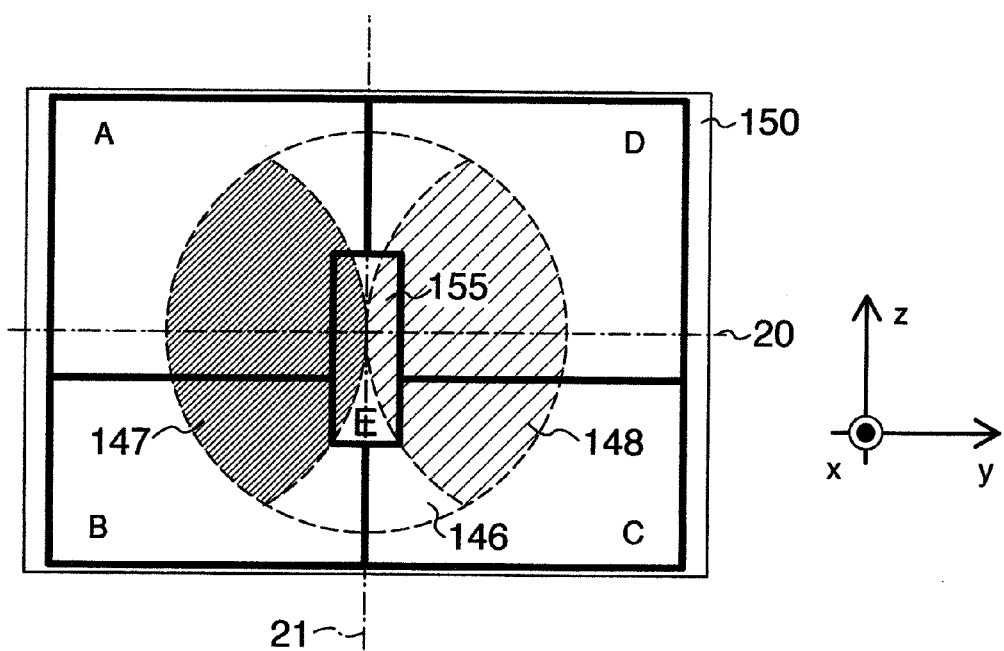
FIG. 15 is a schematic configuration diagram of an optical-signal generation element 150 in the sixth embodiment.

Also, it is allowable to employ the configuration of an optical-signal generation element 150 as is illustrated in FIG. 15 with basically the same purpose. Namely, the region E145 is set up in a manner of being completely separated from the other regions in the direction parallel to the alternate long-and-short dashed line 21. Basically the same effect, however, can also be obtained by setting up a region E 155 in a manner of being partially included in the optical-signal generation element 150.

Also, the light beams on the region E 145 and the region E 155 generate the RF signal. Accordingly, it is desirable that the optical detector be equipped with the light-receiving planes for receiving the light beams from the region E 145 and the region E 155.

Next, the explanation will be given below regarding the performance of the TE signal which is acquired when the optical-signal generation element 140 is used.

Figure 16:
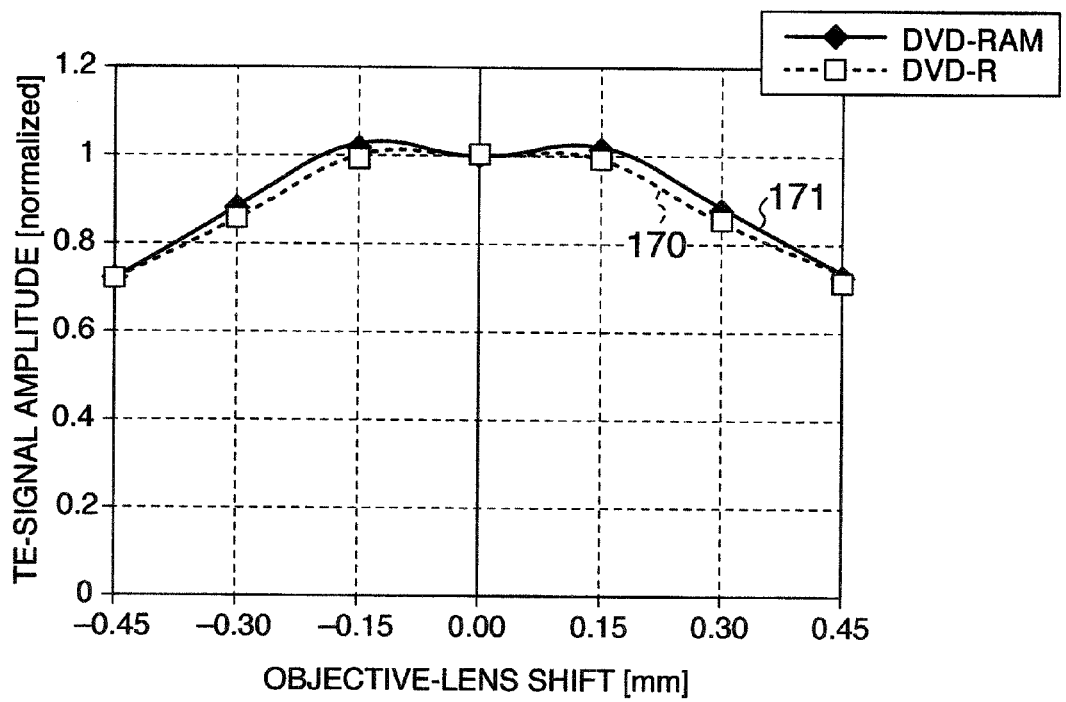
FIG. 16 is a graph for illustrating a simulation result of the objective-lens shift characteristics of the TE-signal amplitude in the sixth embodiment.

FIG. 16 is a graph for illustrating a simulation result of the objective-lens shift characteristics of the TE-signal amplitude acquired from DVD-R and DVD-RAM.

The transverse axis denotes the amount of the objective-lens shift, and the longitudinal axis denotes the amplitude of the TE signal. This amplitude is normalized using its value at the time when the amount of the objective-lens shift is equal to zero.

In the DVD standard, the track pitch of DVD-R is equal to 0.74 μm, and the track pitch of DVD-RAM is equal to 1.23 μm. DVD-R is known as a narrow-track-pitch-equipped optical disc, and DVD-RAM is known as a wide-track-pitch-equipped optical disc.

The simulation condition has been set as follows: Wavelength of the light source: 660 nm, effective diameter of the objective lens: 2.8 mm, NA: 0.65, in-drawing transverse width of the region E145 of the optical-signal generation element 140: 16% of the effective diameter of the incident light beams which are to enter the element 140, and offset amount set for the boundary between the region A 141 and the region B 142 from the alternate long-and-short dashed line 20: 20% of the effective diameter of the incident light beams.

The 2.8-mm-effective-diameter objective lens is assumed to be the one commonly used in the thin-type optical head used in notebook PCs. Also, the transverse width of the region E145 is set so that the performance can be ensured even when the objective-lens shift amount is made equal to ±0.45 mm. The ratio between 2.8 mm, i.e., the effective diameter of the objective lens, and 0.45 mm, i.e., the objective-lens shift amount, is equivalent to about 16%.

The above-described offset amount set for the boundary is effective enough, as long as it falls into an about 5-% to 35-% range of the objective-lens effective diameter. Accordingly, the explanation will be given selecting the result from 20% as an example.

In the graph illustrated in FIG. 16, a dashed line 170 indicates the characteristics of DVD-R, and a solid line 171 indicates the characteristics of DVD-RAM. Both of the characteristics show that the TE-signal amplitude falls into a 0.6 to 1.2 range in the range where the objective-lens shift amount is equal to ±0.45 mm. In a common optical drive device, the satisfying-enough condition is that the TE-signal amplitude falls into the 0.6 to 1.2 range in the range where the objective-lens shift amount is equal to ±0.3 mm. In view of this condition, it can be said that the excellent performance can be obtained in the sufficiently wide range of the objective-lens shift.

Figure 17:
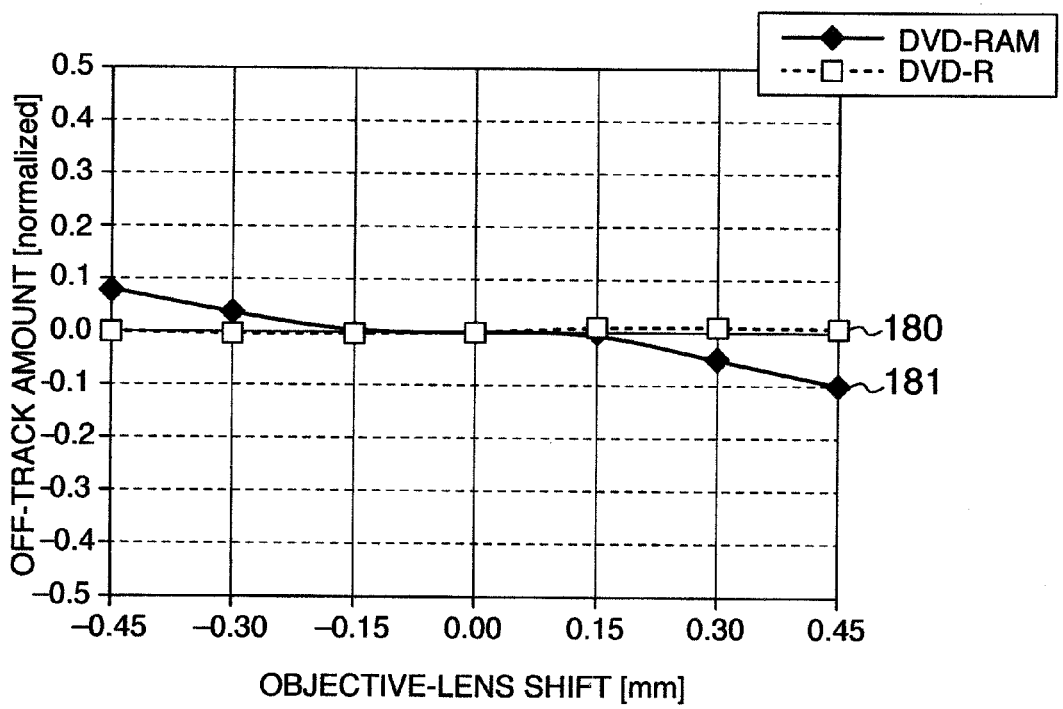
FIG. 17 is a graph for illustrating a simulation result of the objective-lens shift characteristics of an off-track amount in the sixth embodiment.

FIG. 17 is a graph for illustrating a simulation result of the objective-lens shift characteristics of an off-track amount acquired from DVD-R and DVD-RAM. FIG. 17 is the simulation result acquired under the same condition as the one in FIG. 16. The off-track amount, which indicates an error between the amplitude center and track position of the TE signal, is an indicator for indicating the remaining offset amount at the time when the objective-lens shift is performed.

The transverse axis denotes the amount of the objective-lens shift, and the longitudinal axis denotes a value of the off-track amount normalized using the track pitch. A dashed line 180 indicates the characteristics of DVD-R, and a solid line 181 indicates the characteristics of DVD-RAM.

Both of the characteristics show that the off-track amount falls into a ±0.1 range in the range where the objective-lens shift amount is equal to ±0.45 mm. In a common optical drive device, the satisfying-enough condition is that the off-track amount falls into the ±0.1 range in the range where the objective-lens shift amount is equal to ±0.3 mm. In view of this condition, it can be said that the excellent performance can be obtained in the sufficiently wide range of the objective-lens shift.

As having been explained so far, the use of the optical-signal generation element 140 where the region E 145 is set up allows the excellent TE signal to be acquired regardless of whether the track pitch is narrow or wide.

As having been explained so far, in the optical drive device of the present invention, as was illustrated in FIG. 4, FIG. 11, and FIG. 12, there is provided the following optical head of the present application: The optical head, including the light source 2 for emitting light beams, the objective lens 6 for converging the light beams onto an optical disc, the optical-signal generation element 9 for dividing the light beams into at least four regions by using a division line extending in the radial direction of the optical disc, and a division line extending in the track direction of the optical disc, the light beams being reflected by the optical disc, and the optical detector 10 for receiving the light beams divided by the optical-signal generation element 9, wherein the up and down or right and left areas of the four regions are made different from each other by using the division line extending in the radial direction of the optical disc, the four regions being created by using the division line extending in the radial direction of the optical disc, and the division line extending in the track direction of the optical disc.

Here, the above-described four regions are the regions for receiving the light beams A+1, the light beams B+1, the light beams C+1, and the light beams D+1 respectively, i.e., the region A30, the region B31, the region C32, and the region D33 respectively. The up and down or right and left areas of these four regions are made different from each other. For example, the up and down areas of the optical-signal generation element 9, i.e., the area of the region A 22 and that of the region B 23, are different from each other. Also, for example, the up and down areas of the optical-signal generation element 120, i.e., the area of the region A 121 and that of the region B 122, are different from each other. Also, the right and left areas of the optical-signal generation element 9, i.e., the area of the region A 22 and that of the region D 25, are different from each other.

Also, whatever of the optical heads illustrated in FIG. 4 and FIG. 11 includes the optical-signal generation element where the above-described four regions are deployed in a manner of being point-symmetric to each other with reference to the central point of the four regions. The central point of the four regions illustrated in FIG. 4 is the intersection point of the alternate long-and-short dashed line 20 and the alternate long-and-short dashed line 21. The central point of the four regions illustrated in FIG. 11 is the intersection point of the alternate long-and-short dashed line 107 and the alternate long-and-short dashed line 108.

Also, the optical head illustrated in FIG. 12 includes the optical-signal generation element where the above-described four regions are deployed in a manner of being line-symmetric to each other with reference to the central line 21 of the four regions, the central line 21 extending in the track direction.

Also, the optical head illustrated in FIG. 11 includes the optical-signal generation element which is divided into the three regions in the radial direction of the optical disc, and which is divided into the two regions in the track direction of the optical disc.

Also, the optical head illustrated in FIG. 13 includes the optical-signal generation element which is divided into the three regions in the track direction of the optical disc by using two division lines, and which is divided into the two regions in the radial direction of the optical disc, the two division lines being substantially parallel to each other, and extending in the radial direction of the optical disc.

Also, whatever of the optical heads illustrated in FIG. 14 and FIG. 15 includes, as a fifth region, the region E145 or E155 between at least two regions out of the four regions, the division line extending in the track direction being sandwiched between the two regions.

Also, whatever of the optical heads illustrated in FIG. 14 and FIG. 15 includes, as a fifth region, the region E145 or E155 within a region, the region including the intersection point of an extension line of the division line and an extension line of the central line, the division line extending in the track direction of the optical disc, the central line extending in the radial direction of the optical disc.

Hereinafter, the explanation will be given below concerning calculations where the signals from these elements are used.

In the optical head illustrated in FIG. 4, an addition signal generated by adding signals generated from the two regions A 22 and B 23 out of the four regions is defined as a first addition signal, the division line extending in the track direction being sandwiched between the two regions, an addition signal generated by adding signals generated from the two regions D 25 and C 24 being defined as a second addition signal, the two regions D 25 and C 24 being deployed at positions of being point-symmetric to the division-line-sandwiching two regions A 22 and B 23 with reference to the central point, the tracking control signal being generated using at least the first addition signal and the second addition signal. Moreover, the first addition signal is the addition signal $(A+k_1 \times D)$ generated by adding one of the signals multiplied by the first correction coefficient, and the other signal of the signals, the signals being generated from the two regions out of the four regions, the division line extending in the track direction being sandwiched between the two regions. The second addition signal is the addition signal $(k_2 \times B+C)$ generated by adding one of the signals multiplied by the second correction coefficient, and the other signal of the signals, the signals being generated from the two regions, the two regions being deployed at positions of being point-symmetric to the first-addition-signal-generation-used two regions with reference to the central point.

In the optical head illustrated in FIG. 12, an addition signal generated by adding signals generated from the two regions A121 and D124 out of the four regions is defined as a first addition signal, the division line extending in the track direction being sandwiched between the two regions, the two regions being further positioned on a diagonal line, an addition signal generated by adding signals generated from the two regions B 122 and C 120 being defined as a second addition signal, the two regions being positioned on a diagonal line which is different from the diagonal line, the tracking control signal being generated using at least the first addition signal and the second addition signal.

Also, this first addition signal is the addition signal $(A+k_1 \times D)$ generated by adding one of the signals multiplied by the first correction coefficient, and the other signal of the signals, the signals being generated from the two regions out of the four regions, the division line extending in the track direction being sandwiched between the two regions, the two regions being further positioned on the diagonal line. The second addition signal is the addition signal $(k_2 \times B+C)$ generated by adding one of the signals multiplied by the second correction coefficient, and the other signal of the signals, the signals being generated from the two regions, the two regions being positioned on the diagonal line which is different from the diagonal line.

Whatever of the optical heads illustrated in FIG. 14 and FIG. 15 generates the tracking control signal not by using the signal generated from the region E, i.e., the fifth region, but by using the signals generated from the above-described four regions.

Also, the tracking error signal is generated by using at least the difference signal between the push-pull signal and the difference signal which is multiplied by the third correction coefficient, the push-pull signal being generated from the push-pull region, the latter difference signal being a difference between the second addition signal and the first addition signal.

Also, the optical-signal generation elements in all of the above-described embodiments are not necessarily required to be independently configured, but may be so configured as to be a partial component of the optical detector. Namely, in each embodiment, the optical-signal generation element is not necessarily required to be set up, but it is effective enough as long as the optical detector is capable of implementing basically the same functions. This configuration makes it possible to omit the optical-signal generation element, thereby allowing implementation of a reduction in the cost.

Also, the set-up of whatever of the above-described optical heads makes it possible to provide the unit and method for implementing the optical drive device whose configuration is inexpensive, and which allows the generation of the track error signal in which no offset is caused to occur.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical head comprising:
a light source for emitting light beams;
an objective lens for converging the light beams onto an optical disc;
an optical-signal generation element for dividing the light beams into at least four regions by using a division line extending in radial direction of the optical disc, and a division line extending in track direction of the optical disc, the light beams being reflected by the optical disc; and
an optical detector for receiving the light beams divided by the optical-signal generation element, wherein
up and down or right and left areas of the at least four regions are made different from each other by using the division line extending in radial direction of optical disc, the at least four regions being created by using the division line extending in radial direction of optical disc, and the division line extending in track direction of optical disc, wherein
the at least four regions are deployed in a manner of being line-symmetric to each other with reference to central line of the at least four regions, the central line extending in track direction, wherein
an addition signal generated by adding signals generated from two regions out of the four regions is defined as a first addition signal, the division line extending in the track direction being sandwiched between the two regions, the two regions being further positioned on a first diagonal line,
an addition signal generated by adding signals generated from two regions being defined as a second addition signal, the two regions being positioned on a second diagonal line which is different from the first diagonal line, a tracking control signal being generated using at least the first addition signal and the second addition signal, and wherein
the first addition signal is the addition signal generated by adding one of the signals multiplied by a first correction coefficient, and the other signal of the signals, the signals being generated from the two regions out of the four regions, the division line extending in the track direction being sandwiched between the two regions, the two regions being further positioned on the diagonal line,
the second addition signal is the addition signal generated by adding one of the signals multiplied by a second correction coefficient, and the other signal of the signals, the signals being generated from the two regions, the two regions being positioned on the diagonal line which is different from the diagonal line.

2. The optical head according to claim 1, wherein four regions are deployed in a manner of being point-symmetric to each other with reference to central point of four regions.

3. The optical head according to claim 2, wherein optical-signal generation element is divided into three regions in radial direction of optical disc, and is divided into two regions in the track direction of the optical disc.

4. The optical head according to claim 2, wherein the optical-signal generation element is divided into three regions in the track direction of the optical disc by using two division lines, and is divided into two regions in the radial direction of the optical disc, the two division lines being substantially parallel to each other, and extending in the radial direction of the optical disc.

5. The optical head according to claim 2, wherein an addition signal generated by adding signals generated from two regions out of the four regions is defined as a first addition signal, the division line extending in the track direction being sandwiched between the two regions,
an addition signal generated by adding signals generated from two regions being defined as a second addition signal, the two regions being deployed at positions of being point-symmetric to the division-line-sandwiching two regions with reference to the central point,
a tracking control signal being generated using at least the first addition signal and the second addition signal.

6. The optical head according to claim 5, wherein the first addition signal is the addition signal generated by adding one of the signals multiplied by a first correction coefficient, and the other signal of the signals, the signals being generated from the two regions out of the four regions, the division line extending in the track direction being sandwiched between the two regions,
the second addition signal is the addition signal generated by adding one of the signals multiplied by a second correction coefficient, and the other signal of the signals, the signals being generated from the two regions, the two regions being deployed at positions of being point-symmetric to the first-addition-signal-generation-used two regions with reference to the central point.

7. The optical head according to claim 6, wherein the tracking control signal is generated without using a signal generated from a fifth region.

8. The optical head according to claim 6, wherein a tracking error signal is generated by using at least a difference signal between a push-pull signal and a difference signal which is multiplied by a third correction coefficient, the push-pull signal being generated from a push-pull region, the latter difference signal being a difference between the second addition signal and the first addition signal.

9. The optical head according to claim 1, further comprising:
a fifth region between at least two regions out of the four regions, the division line extending in the track direction being sandwiched between the two regions.

10. The optical head according to claim 1, further comprising:
- a fifth region within a region, the region including intersection point of an extension line of the division line and an extension line of the central line, the division line extending in the track direction of the optical disc, the central line extending in the radial direction of the optical disc.

11. The optical head according to claim 1, wherein
the optical-signal generation element is so configured as to be a partial configuration component of the optical detector.

12. An optical drive device which comprises the optical head as claimed in claim 1.

13. The optical head according to claim 1, wherein
the tracking control signal is generated without using a signal generated from a fifth region.

14. The optical head according to claim 1, wherein
a tracking error signal is generated by using at least a difference signal between a push-pull signal and a difference signal which is multiplied by a third correction coefficient, the push-pull signal being generated from a push-pull region, the latter difference signal being a difference between the second addition signal and the first addition signal.

* * * * *